United States Patent
Numajiri et al.

(10) Patent No.: US 8,083,212 B2
(45) Date of Patent: Dec. 27, 2011

(54) WIND-TURBINE ROTOR-BLADE HOISTING APPARATUS, METHOD FOR ATTACHING WIND-TURBINE ROTOR BLADE, AND METHOD FOR CONSTRUCTING WIND POWER GENERATOR

(75) Inventors: Tomohiro Numajiri, Nagasaki (JP); Nobuyasu Nakamura, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 92 days.

(21) Appl. No.: 12/311,627

(22) PCT Filed: May 22, 2008

(86) PCT No.: PCT/JP2008/059474
§ 371 (c)(1),
(2), (4) Date: Apr. 7, 2009

(87) PCT Pub. No.: WO2008/155976
PCT Pub. Date: Dec. 24, 2008

(65) Prior Publication Data
US 2010/0028152 A1    Feb. 4, 2010

(30) Foreign Application Priority Data
Jun. 20, 2007 (JP) ................. 2007-162840

(51) Int. Cl.
*B66D 1/26* (2006.01)
(52) U.S. Cl. ............... 254/278; 254/329; 416/142
(58) Field of Classification Search .............. 254/278, 254/279, 329; 416/142, 119
See application file for complete search history.

(56) References Cited

U.S. PATENT DOCUMENTS

| | | | | |
|---|---|---|---|---|
| 2,335,692 | A * | 11/1943 | Murray | 414/346 |
| 6,364,609 | B1 * | 4/2002 | Barnes | 416/142 |
| 6,932,326 | B1 * | 8/2005 | Krabbendam | 254/334 |
| 7,207,777 | B2 * | 4/2007 | Bervang | 416/119 |
| 7,713,007 | B2 * | 5/2010 | Kootstra | 410/44 |
| 7,726,941 | B2 * | 6/2010 | Bervang | 416/1 |

(Continued)

FOREIGN PATENT DOCUMENTS
EP   1 101 934 A1   5/2001
(Continued)

*Primary Examiner* — Emmanuel M Marcelo
(74) *Attorney, Agent, or Firm* — Manabu Kanesaka; Kenneth M. Berner; Benjamin J. Hauptman

(57) ABSTRACT

The present invention provides a wind-turbine rotor-blade hoisting apparatus that enables attachment and removal of wind-turbine rotor blades without using a plurality of heavy machines and that enables attachment and removal of wind-turbine rotor blades on a site having a complex land shape with little flat land, a method for attaching a wind-turbine rotor blade, and a method for constructing a wind power generator. The present invention is characterized in that it includes a sheave (14) that guides a hoisting wire (17) from a rotor head (4), to which a wind-turbine rotor blade (6) is to be attached, toward the wind-turbine rotor blade (6) and that is arranged so as to be movable in a direction along the rotation axis of the rotor head (4); a retaining portion (15) that retains an attaching end of the wind-turbine rotor blade (6) such that a line connecting the center of gravity of the wind-turbine rotor blade (6) and a connecting portion, to which the hoisting wire (17) is connected, crosses the longitudinal axis of the wind-turbine rotor blade (6); and a winch (12) that is disposed on the ground and that draws the hoisting wire (17) to wind up or let out the retaining portion (15).

7 Claims, 20 Drawing Sheets

U.S. PATENT DOCUMENTS

| | | | |
|---|---|---|---|
| 7,735,808 B2* | 6/2010 | Viladomiu i Guarro et al. | 254/278 |
| 2003/0183594 A1* | 10/2003 | Torres Martinez | 212/196 |
| 2004/0169376 A1* | 9/2004 | Ruer et al. | 290/55 |
| 2005/0019166 A1* | 1/2005 | Bervang | 416/244 A |
| 2006/0151767 A1 | 7/2006 | Wobben | |
| 2006/0175465 A1* | 8/2006 | Teichert | 244/33 |
| 2007/0151194 A1* | 7/2007 | Livingston et al. | 52/651.05 |
| 2007/0266538 A1* | 11/2007 | Bervang | 29/428 |
| 2007/0290426 A1* | 12/2007 | Trede et al. | 269/1 |
| 2008/0078128 A1* | 4/2008 | Livingston et al. | 52/40 |
| 2008/0216301 A1* | 9/2008 | Hansen et al. | 29/428 |
| 2008/0257844 A1* | 10/2008 | Llorente Gonzalez et al. | 212/179 |
| 2010/0011575 A1* | 1/2010 | Numajiri | 29/889.1 |
| 2010/0018055 A1* | 1/2010 | Lynderup et al. | 29/889 |
| 2010/0028152 A1* | 2/2010 | Numajiri et al. | 416/146 R |
| 2010/0111665 A1* | 5/2010 | Daniels | 414/814 |
| 2010/0139062 A1* | 6/2010 | Reed et al. | 29/23.51 |

FOREIGN PATENT DOCUMENTS

| | | |
|---|---|---|
| EP | 1 101 936 A2 | 5/2001 |
| JP | U-H03-51182 | 5/1991 |
| JP | 2004-293455 | 10/2004 |
| JP | 2006-152862 | 6/2006 |
| JP | 2007-162639 | 6/2007 |
| TW | 566483 U | 12/2003 |
| TW | 200427923 | 12/2004 |

* cited by examiner

WIND-TURBINE ROTOR-BLADE HOISTING APPARATUS, METHOD FOR ATTACHING WIND-TURBINE ROTOR BLADE, AND METHOD FOR CONSTRUCTING WIND POWER GENERATOR

TECHNICAL FIELD

The present invention relates to a wind-turbine rotor-blade hoisting apparatus particularly suitable for attaching and removing wind-turbine rotor blades one by one, to a method for attaching a wind-turbine rotor blade, and to a method for constructing a wind power generator.

BACKGROUND ART

Conventionally, in a wind power generator, when a nacelle mounted on the top of a tower, a rotor head, a wind-turbine rotor blade, or another large component, such as a gear box, breaks or is damaged and is to be replaced, a large crane is used.

Or, when constructing a wind power generator in a place like a mountainous area, where securing flat land is difficult, wind-turbine rotor blades have to be attached one by one to the rotor head. That is, because the wind-turbine rotor blades have to be attached to the rotor head on flat land, when securing flat land is difficult, the wind-turbine rotor blades have to be attached one by one to the rotor head mounted on the top of the tower (for example, refer to Patent Document 1).
Patent Document 1: Japanese Translation of PCT International Application, Publication No. 2005-531709

DISCLOSURE OF INVENTION

In the above-described wind power generator, the rotation axis of the rotor head is provided with a tilt angle and the wind-turbine rotor blades are provided with a cone angle to prevent the wind-turbine rotor blades from interfering with the tower.

Therefore, as disclosed in Patent Document 1, when hoisting the wind-turbine rotor blades one by one to attach or remove them, the orientation of each wind-turbine rotor blade has to be inclined by an angle equal to the tilt angle and the cone angle. More specifically, the orientation of the wind-turbine rotor blade is adjusted by holding the tip of the wind-turbine rotor blade with a heavy machine, such as a crane.

Because a heavy machine used solely for adjusting the orientation of the wind-turbine rotor blades is required besides the heavy machine for lifting or lowering the wind-turbine rotor blades, there is a problem in that the cost of mounting the wind-turbine rotor blades is high.

The present invention has been made to solve the above-described problem, and an object thereof is to provide a wind-turbine rotor-blade hoisting apparatus that enables attachment and removal of wind-turbine rotor blades without using a plurality of heavy machines and that enables attachment and removal of wind-turbine rotor blades on a site having a complex land shape with little flat land, a method for attaching a wind-turbine rotor blade, and a method for constructing a wind power generator.

To achieve the above-described object, the present invention provides the following solutions.

A first aspect of the present invention is a wind-turbine rotor-blade hoisting apparatus including: a sheave that guides a hoisting wire from a rotor head, to which a wind-turbine rotor blade is to be attached, toward the wind-turbine rotor blade and that is arranged so as to be movable in a direction along a rotation axis of the rotor head; a retaining portion that retains an attaching end of the wind-turbine rotor blade such that a line connecting the center of gravity of the wind-turbine rotor blade and a connecting portion, to which the hoisting wire is connected, crosses a longitudinal axis of the wind-turbine rotor blade; and a winch that is disposed in the rotor head, in a nacelle to which the rotor head is attached, or on the ground and that draws the hoisting wire to wind up or let out the retaining portion.

According to the first aspect the present invention, the wind-turbine rotor blade is hoisted by the hoisting wire via the retaining portion. At this time, the wind-turbine rotor blade is in an orientation in which a line connecting the center of gravity of the wind-turbine rotor blade and the connecting portion extends along the vertical direction. That is, the wind-turbine rotor blade is hoisted in an orientation in which the longitudinal axis crosses the vertical direction.

For example, when the angle formed between the vertical direction and the above-mentioned longitudinal axis direction is substantially equal to the sum of the tilt angle of the rotor head and the cone angle of the wind-turbine rotor blade, the wind-turbine rotor blade can be attached to or removed from the rotor head without adjusting the orientation of the hoisted wind-turbine rotor blade. Accordingly, there is no need to use a heavy machine and the like for adjusting the orientation of the wind-turbine rotor blade.

By moving the sheave in the direction along the rotation axis of the rotor head, the wind-turbine rotor blade is moved relative to the rotor head in the above-mentioned direction. Thus, by moving the sheave in accordance with winding up or letting out of the hoisting wire, the wind-turbine rotor blade can be moved toward or away from the rotor head along the above-mentioned longitudinal axis direction.

For example, when the rotor head and the wind-turbine rotor blade are fixed by a bolt extending in the above-mentioned longitudinal axis direction, the wind-turbine rotor blade can be moved toward or away from the rotor head while preventing the bolt and a through-hole into which the bolt is to be inserted from interfering with each other. Accordingly, there is no need to use a heavy machine and the like for preventing the bolt and the through-hole from interfering with each other.

Because winding up or letting out of the retaining portion and the wind-turbine rotor blade held by the retaining portion is performed by the winch disposed in the rotor head, in the nacelle, or on the ground, the number of heavy machines to be used can be reduced compared to conventional hoisting of the wind-turbine rotor blade.

In the first aspect of the present invention, it is preferable that the retaining portion includes a frame to be attached to the inside of an opening provided in the attaching end of the wind-turbine rotor blade, and the frame includes the connecting portion.

This enables the frame to be attached to the opening provided in the attaching end to hoist the wind-turbine rotor blade via the connecting portion provided on the frame. Accordingly, even when a line connecting the center of gravity of the wind-turbine rotor blade and the connecting portion passes through the inside of the opening, the hoisting wire and the wind-turbine rotor blade can be prevented from interfering with each other. Thus, the wind-turbine rotor blade can be stably hoisted.

For example, when the angle formed between the line connecting the center of gravity of the wind-turbine rotor blade and the connecting portion and the longitudinal axis of the wind-turbine rotor blade is small, the line connecting the center of gravity of the wind-turbine rotor blade and the connecting portion passes through the inside of the opening. Even in that case, the wind-turbine rotor blade can be stably hoisted.

In the above-described structure, it is preferable that the frame include an insertion portion through which the hoisting wire extending from the connecting portion toward the sheave passes.

This stabilizes the relative positional relationship between the hoisting wire and the retaining portion by allowing the hoisting wire to pass through the insertion portion. Accordingly, the orientation of the wind-turbine rotor blade hoisted by the hoisting wire via the retaining portion also stabilizes.

In the first aspect of the present invention, it is preferable that the retaining portion include an inclined portion that is inclined toward the attaching end and extends from the connecting portion disposed radially outside of the wind-turbine rotor blade toward the wind-turbine rotor blade, and a retaining sling that extends from the connecting portion and is wound around the outer peripheral surface of the wind-turbine rotor blade.

This allows the connecting portion, to which the hoisting wire is connected, to be stably disposed radially outside of the wind-turbine rotor blade by the inclined portion and the retaining sling. Therefore, even when the line connecting the center of gravity of the wind-turbine rotor blade and the connecting portion projects radially outward from the attaching end, the wind-turbine rotor blade can be stably hoisted.

For example, when the angle formed between the line connecting the center of gravity of the wind-turbine rotor blade and the connecting portion and the longitudinal axis of the wind-turbine rotor blade is large, the line connecting the center of gravity of the wind-turbine rotor blade and the connecting portion projects radially outward from the attaching end. Even in that case, the wind-turbine rotor blade can be stably hoisted.

In the first aspect of the present invention, it is preferable that the retaining portion include an inclined portion that is inclined toward the attaching end and extends from the connecting portion disposed radially outside of the wind-turbine rotor blade toward the wind-turbine rotor blade, and a retaining sling that extends from the connecting portion and is wound around the outer peripheral surface of the wind-turbine rotor blade, and it is preferable that the inclined portion branch so as to sandwich the wind-turbine rotor blade and that an auxiliary sling that extends from ends of the inclined portion and is wound around the outer peripheral surface of the wind-turbine rotor blade opposite the connecting portion be provided.

This allows the auxiliary sling extending from the ends of the inclined portion to be wound around the outer peripheral surface of the wind-turbine rotor blade opposite the connecting portion and press the outer peripheral surface. Accordingly, the auxiliary sling can suppress the rotation of the wind-turbine rotor blade about the center of gravity to stabilize the orientation of the wind-turbine rotor blade.

A second aspect of the present invention provides a method for attaching a wind-turbine rotor blade including: a preparation step in which the wind-turbine rotor-blade hoisting apparatus according to any one of claims 1 to 5 is attached to a wind-turbine rotor blade disposed on the ground and a rotor head disposed on a tower and in which a hoisting auxiliary bracket is attached to a tip of the wind-turbine rotor blade; a lifting step in which the hoisting wire attached to the retaining portion and a hoisting auxiliary wire attached to the hoisting auxiliary bracket are pulled to lift the wind-turbine rotor blade in the same orientation as it is on the ground; a rotating step in which the wind-turbine rotor blade is further pulled by the hoisting apparatus to rotate the orientation of the wind-turbine rotor blade; and an attaching step in which the wind-turbine rotor blade is attached to the rotor head.

According to the second aspect of the present invention, because the wind-turbine rotor blade is lifted in the same orientation as it is on the ground with the hoisting apparatus and the hoisting auxiliary bracket of the present invention and is then hoisted by the retaining portion, the tip of the wind-turbine rotor blade and the ground are prevented from interfering with each other. Thus, the wind-turbine rotor blade can be prevented from being damaged.

Furthermore, when the wind-turbine rotor blade is attached to the rotor head, the wind-turbine rotor blade is hoisted by the retaining portion. This enables the angle formed between the vertical direction and the above-mentioned longitudinal axis direction to be substantially equal to the sum of the tilt angle of the rotor head and the cone angle of the wind-turbine rotor blade. Accordingly, there is no need to use a heavy machine and the like for adjusting the orientation of the wind-turbine rotor blade.

In the second aspect of the present invention, it is preferable that, in the attaching step, the wind-turbine rotor blade be pulled and the position of the sheave attached to the rotor head be moved in the direction along the rotation axis of the rotor head.

This allows the wind-turbine rotor blade to be moved relative to the rotor head in the above-mentioned direction by moving the sheave in the direction along the rotation axis of the rotor head. Thus, by moving the sheave in accordance with winding up or letting out of the hoisting wire, the wind-turbine rotor blade can be moved toward or away from the rotor head along the above-mentioned longitudinal axis direction.

A third aspect of the present invention provides a method for constructing a wind power generator using the method for attaching a wind-turbine rotor blade according to the second aspect.

According to the third aspect of the present invention, because the method for attaching a wind-turbine rotor blade according to the second aspect of the present invention is used, the wind-turbine rotor blade can be attached to or removed from the rotor head without using a plurality of heavy machines. Furthermore, attachment and removal of the wind-turbine rotor blade can be performed at a site having a complex land shape with little flat land.

With the wind-turbine rotor-blade hoisting apparatus according to the first aspect of the present invention, the method for attaching a wind-turbine rotor blade according to the second aspect, and the method for constructing a wind power generator according to the third aspect, the wind-turbine rotor blade is hoisted by the hoisting wire via the retaining portion, and thus, is hoisted in an orientation in which the vertical direction crosses the longitudinal axis. This provides advantages in that attachment and removal of the wind-turbine rotor blade can be performed without using a plurality of heavy machines and in that attachment and removal of the wind-turbine rotor blade can be performed at a site having a complex land shape with little flat land.

By moving the sheave in the direction along the rotation axis of the rotor head, advantages are provided in that attachment and removal of the wind-turbine rotor blade can be performed without using a plurality of heavy machines and in that attachment and removal of the wind-turbine rotor blade can be performed at a site having a complex land shape with little flat land.

Because winding up or letting out of the retaining portion and the wind-turbine rotor blade held by the retaining portion is performed by the winch disposed in the rotor head, in the nacelle, or on the ground, advantages are provided in that attachment and removal of the wind-turbine rotor blade can be performed without using a plurality of heavy machines and in that attachment and removal of the wind-turbine rotor blade can be performed at a site having a complex land shape with little flat land.

EXPLANATION OF REFERENCE SIGNS

Figure 1:
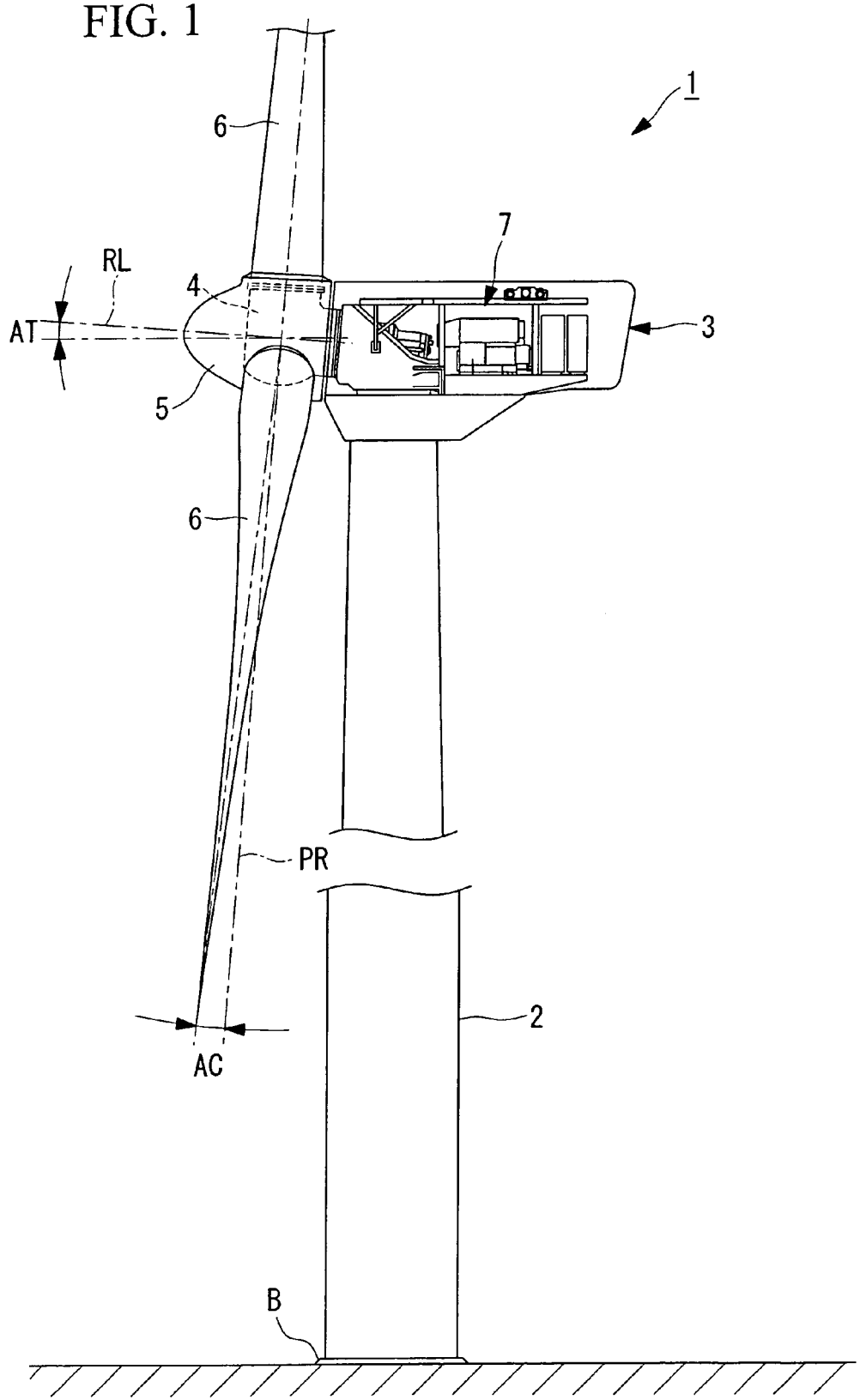
FIG. 1 is a diagram showing the structure of a wind power generator according to a first embodiment of the present invention.

1: wind power generator
2: tower
3: nacelle
4: rotor head
6: wind-turbine rotor blade
11, 111: hoisting apparatus
12: winch
14, 114: sheave portion (sheave)
15, 115: hoisting jig (retaining portion)
24: fixed sheave (sheave)
31, 131: connecting plate (connecting portion)
32: jig main body (inclined portion)
35: retaining sling
17: hoisting wire
36: auxiliary sling
18: hoisting auxiliary wire
132: upper frame (frame)
134: center ring (insertion portion)
S1: preparation step
S2: lifting step
S3: rotating step
S4: attaching step

BEST MODE FOR CARRYING OUT THE INVENTION

First Embodiment

Referring to FIGS. 1 to 17, a wind power generator according to a first embodiment of the present invention will be described below.

FIG. 1 is a diagram showing the structure of the wind power generator according to this embodiment.

As shown in FIG. 1, a wind power generator 1 performs wind power generation. The wind power generator 1 includes a tower 2 installed upright on a foundation B, a nacelle 3 mounted on the top of the tower 2, a rotor head 4 mounted to the nacelle 3 so as to be rotatable about a substantially horizontal axis, a head capsule 5 for covering the rotor head 4, a plurality of wind-turbine rotor blades 6 radially attached around the rotation axis of the rotor head 4, and a power generating unit 7 for generating power by rotation of the rotor head 4.

Although this embodiment will be described as applied to an example in which three wind-turbine rotor blades 6 are provided, the number of the wind-turbine rotor blades 6 is not limited to three, but may be two or more than three; and it is not specifically limited.

As shown in FIG. 1, the tower 2 has a columnar structure extending upward (upward in FIG. 1) from the foundation B, and has a structure in which, for example, a plurality of units are connected in the vertical direction. The nacelle 3 is mounted on the top of the tower 2. When the tower 2 consists of a plurality of units, the nacelle 3 is mounted on the top unit.

As shown in FIG. 1, the nacelle 3 rotatably supports the rotor head 4 and accommodates the power generating unit 7 for generating power by rotation of the rotor head 4.

As shown in FIG. 1, the rotor head 4 is attached to the nacelle 3 in an orientation in which a rotation axis RL is inclined upward with respect to the horizontal direction by a tilt angle AT.

The plurality of wind-turbine rotor blades 6 are attached to the rotor head 4, radially around the rotation axis RL, and the periphery of the rotor head 4 is covered by the head capsule 5. The wind-turbine rotor blades 6 are each provided, toward the tip thereof, with a cone angle AC inclined forward (the left side in FIG. 1) from a rotation plane PR that is perpendicular to the rotation axis RL.

As shown in FIG. 1, the head capsule 5 covers the rotor head 4 and rotates together with the wind-turbine rotor blades 6 and the rotor head 4 about substantially the horizontal axis.

An example of the power generating unit 7 is, for example, as shown in FIG. 1, one having a generator, to which the rotational driving force of the rotor head 4 is transmitted so that power is generated, and a transformer for converting power generated by the generator into alternating-current power having a predetermined frequency (for example, alternating-current power of 50 Hz or 60 Hz).

An overview of a method for generating power using the wind power generator 1 having the above-described structure will be described.

In the wind power generator 1, the force of the wind blowing in the rotation axis direction of the rotor head 4 against the wind-turbine rotor blades 6 is converted into motive power for rotating the rotor head 4 about the rotation axis.

The rotation of the rotor head 4 is transmitted to the power generating unit 7, where electric power suitable for an object to be supplied with electric power, for example, alternating-current power having a frequency of 50 Hz or 60 Hz, is generated.

At least during power generation, to allow the force of the wind to effectively act on the wind-turbine rotor blades, the nacelle 3 is appropriately rotated in the horizontal plane to make the rotor head 4 face the wind.

A method for attaching and removing the wind-turbine rotor blades 6 in the wind power generator 1, which is a feature of the present invention, will be described next.

Figure 2:
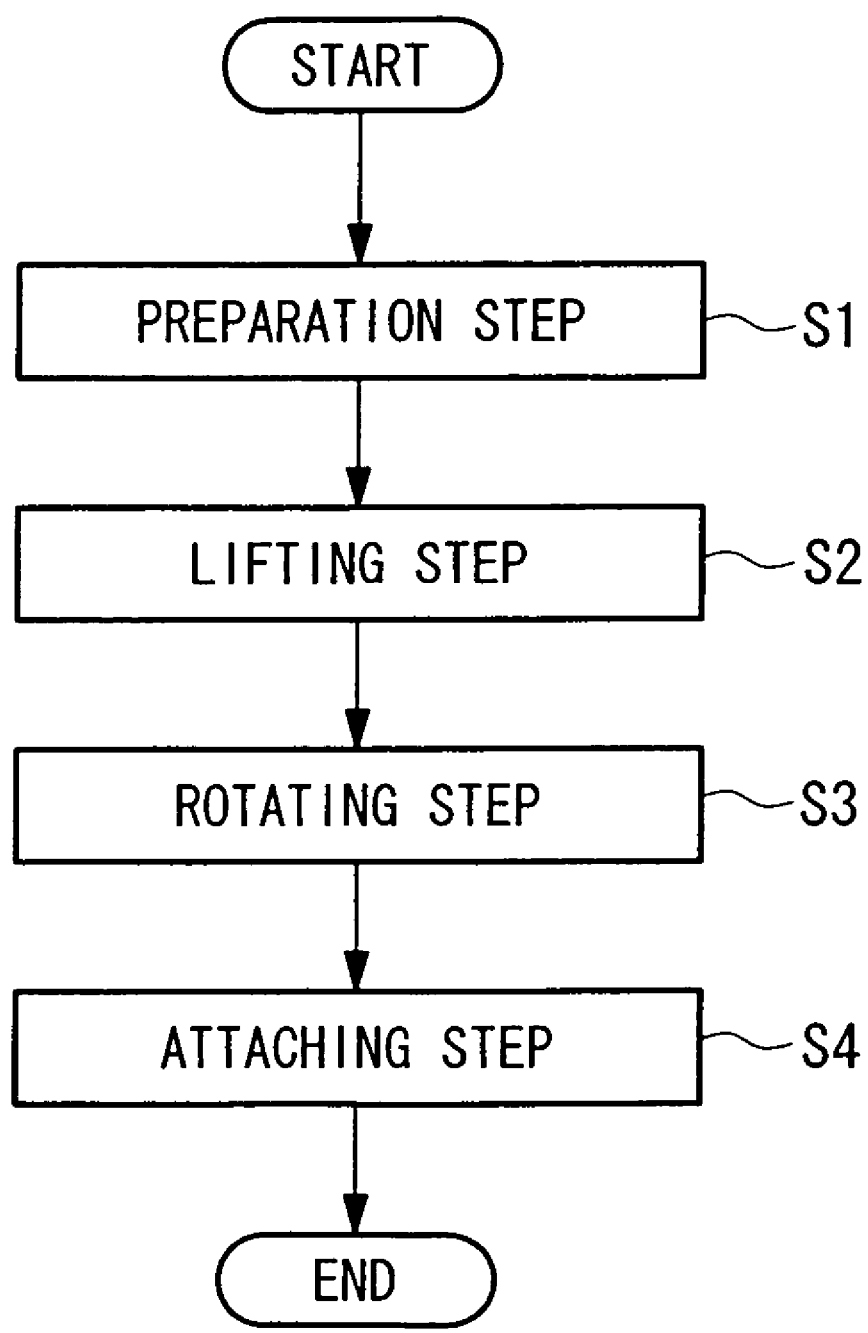
FIG. 2 is a flowchart showing a method for attaching a wind-turbine rotor blade shown in FIG. 1.
Figure 3:
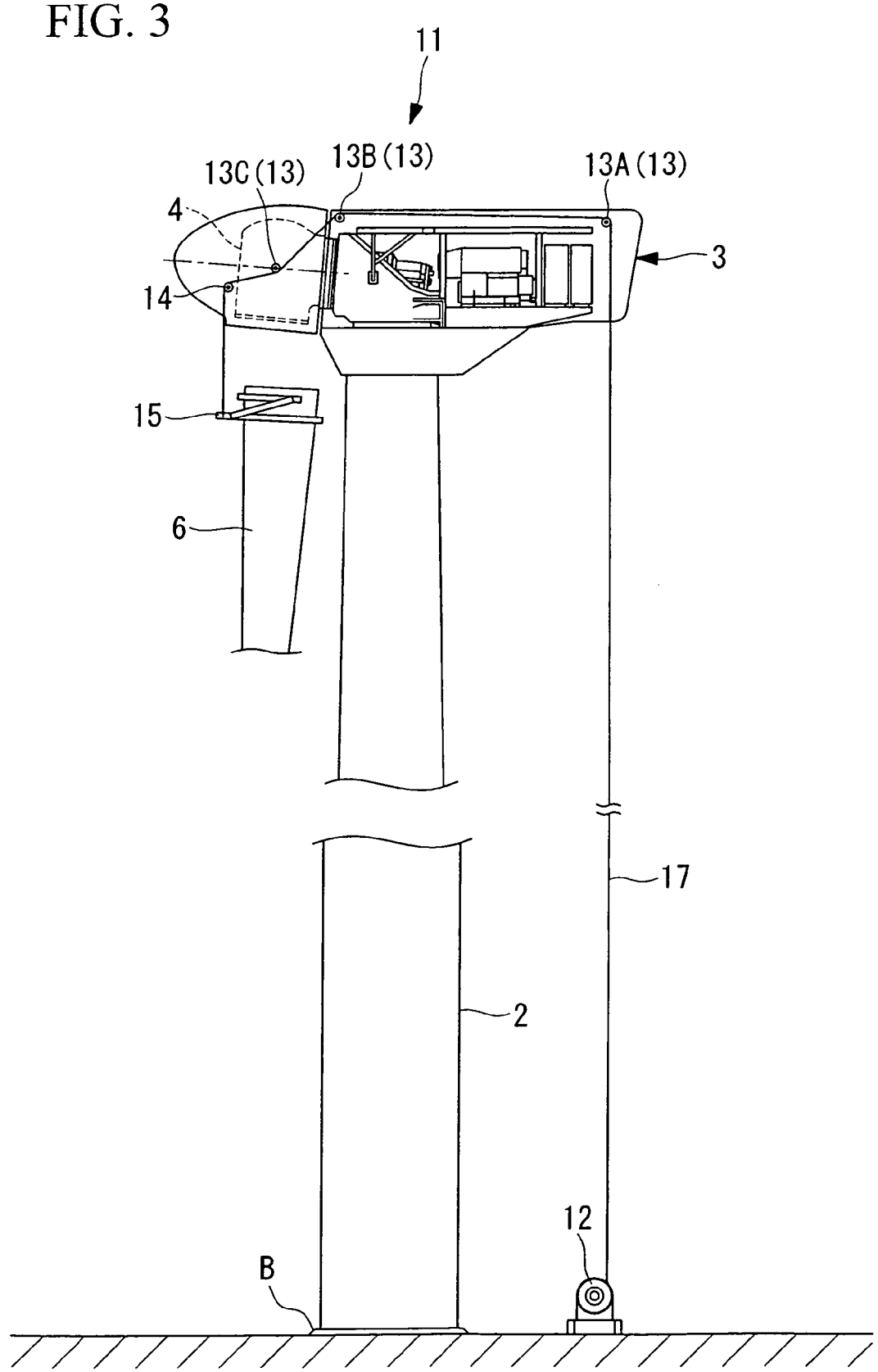
FIG. 3 is a schematic diagram showing the arrangement of a sheave and a winch during attachment of the wind-turbine rotor blade shown in FIG. 1.
Figure 4:
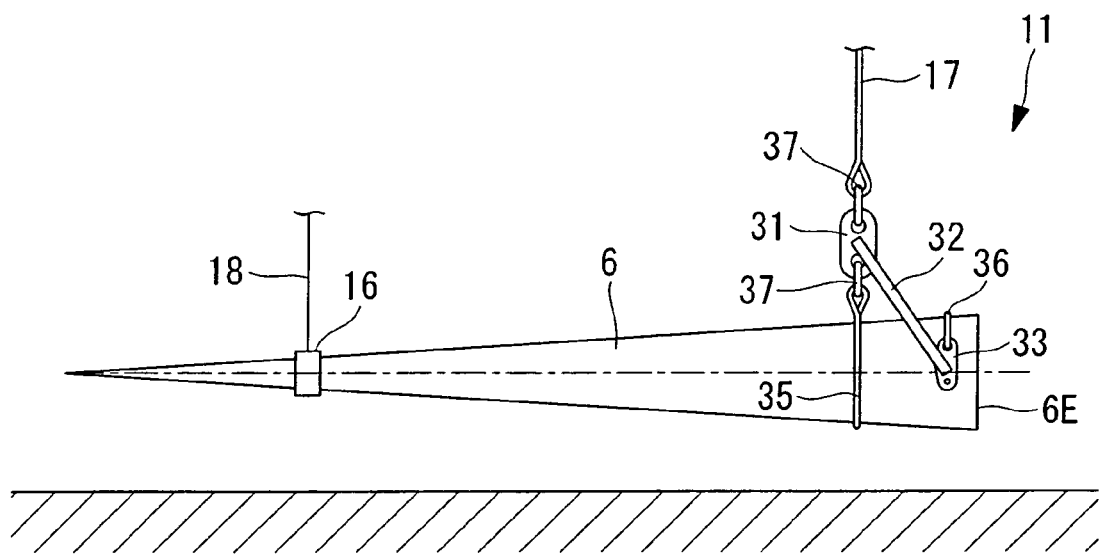
FIG. 4 is a schematic diagram showing the wind-turbine rotor blade to which a hoisting jig and an auxiliary bracket are attached.

FIG. 2 is a flowchart showing a method for attaching the wind-turbine rotor blade shown in FIG. 1. FIG. 3 is a schematic diagram showing the arrangement of a sheave and a winch during attachment of the wind-turbine rotor blade shown in FIG. 1. FIG. 4 is a schematic diagram showing the wind-turbine rotor blade to which a hoisting jig and an auxiliary bracket are attached.

Because the methods for installing the tower 2 and for attaching the nacelle 3, the rotor head 4, and the head capsule 5 are the same as known methods, an explanation thereof will be omitted.

First, as shown in FIGS. 2 and 3, a hoisting apparatus 11 is attached (a preparation step S1). The hoisting apparatus 11 includes a winch 12, pulleys 13, a sheave portion (sheave) 14, a hoisting jig (retaining portion) 15, and an auxiliary bracket 16.

More specifically, the winch 12 is provided on the ground, and the pulleys 13 and the sheave portion 14 are attached inside the head capsule 5 and the nacelle 3. Furthermore, as shown in FIG. 4, the hoisting jig 15 and the auxiliary bracket 16 are attached to the wind-turbine rotor blade 6.

As shown in FIG. 3, the winch 12 lifts or lowers the wind-turbine rotor blade 6 by winding up or letting out a hoisting wire 17. The hoisting wire 17 extends from the winch 12 toward the nacelle 3 and is guided by the pulleys 13 and the sheave portion 14 to the hoisting jig 15 attached to the wind-turbine rotor blade 6.

A known winch may be employed as the winch 12, and it is not specifically limited.

Figure 5:
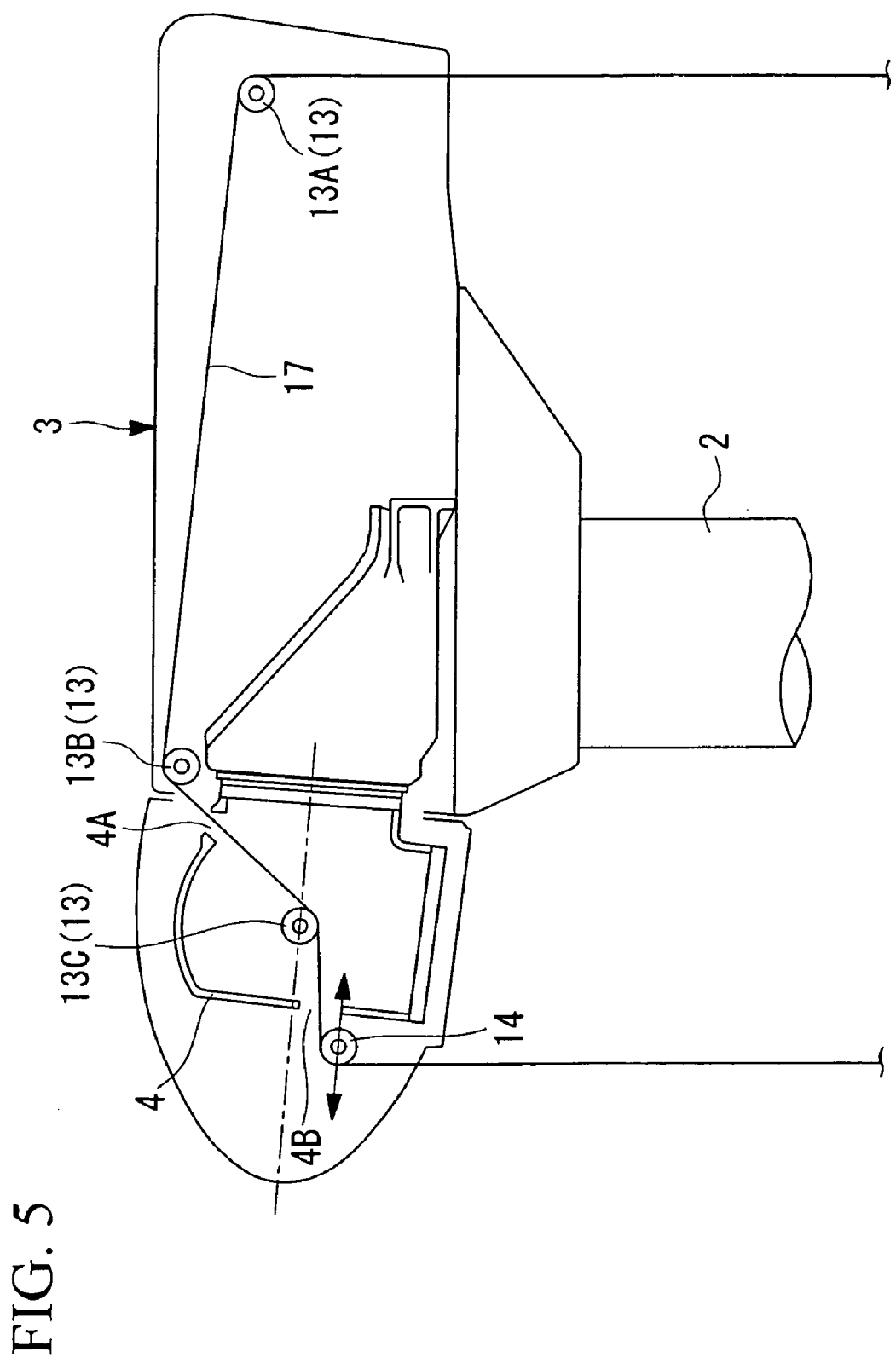
FIG. 5 is a schematic diagram showing the arrangement of pulleys and the sheave shown in FIG. 3.

FIG. 5 is a schematic diagram showing the arrangement of pulleys and the sheave shown in FIG. 3.

As shown in FIG. 5, the pulleys 13 guide the hoisting wire 17 extending from the winch 12 to the sheave portion 14.

The hoisting wire 17 extending from the winch 12 is wound around a rear pulley 13A disposed at the rear of the nacelle 3 and is guided to a front pulley 13B disposed at the front of the nacelle 3. The hoisting wire 17 wound around the front pulley 13B is guided to an in-head pulley 13C disposed in the rotor head 4, and is then guided from the in-head pulley 13C to the sheave portion 14.

At this time, the hoisting wire 17 is arranged so as to pass through first and second maintenance holes 4A and 4B formed in the rotor head 4. The first maintenance hole 4A is an opening formed in a side surface of the rotor head 4, and the second maintenance hole 4B is an opening formed in the front surface of the rotor head 4. The first and second maintenance holes 4A and 4B are used as entrance/exit ports when performing maintenance of the equipment accommodated in the rotor head 4, for example, a pitch drive system for the wind-turbine rotor blades 6.

Figure 6:
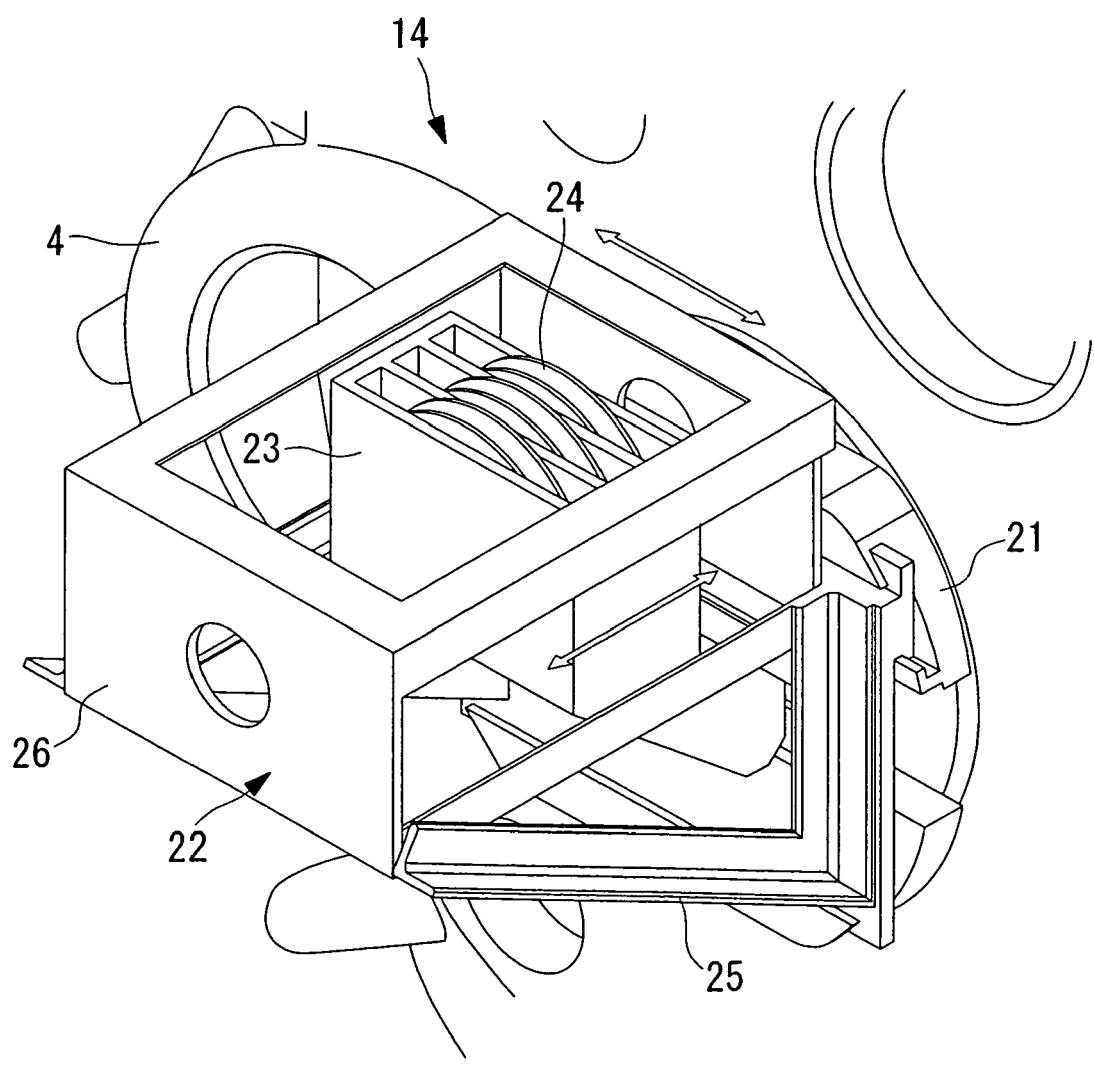
FIG. 6 is a partial perspective view showing the structure of the sheave shown in FIG. 3.
Figure 6:
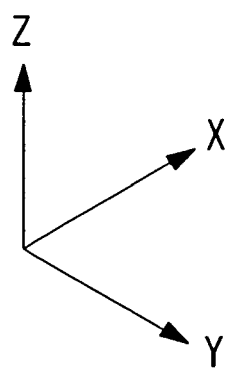

FIG. 6 is a partial perspective view showing the structure of the sheave shown in FIG. 3.

As shown in FIG. 5, the sheave portion 14 is removably disposed at the tip of the rotor head 4 and guides the hoisting wire 17, which is guided by the pulleys 13, to the hoisting jig 15.

As shown in FIG. 6, the sheave portion 14 includes a frame guide 21 attached to the rotor head 4, a sheave frame 22 attached to the frame guide 21, and a sheave guide 23 which is accommodated in the sheave frame 22 and holds a fixed sheave (sheave) 24.

The frame guide 21, the sheave frame 22, and the sheave guide 23 are configured to be separable.

The frame guide 21 supports the sheave frame 22 and the sheave guide 23 so as to be movable in the left-right direction of the nacelle 3 (Y-axis direction in FIG. 6). The frame guide 21 has a groove extending in the Y-axis direction, to which the sheave frame 22 is fitted so as to be capable of relative motion.

The sheave frame 22 supports the sheave guide 23 so as to be movable in the rotation axis RL direction of the rotor head 4, i.e., the front-rear direction of the nacelle 3 (X-axis direction in FIG. 6).

The sheave frame 22 includes a frame portion 25 fitted to the frame guide 21 so as to be capable of relative motion and a box portion 26 that accommodates and supports the sheave guide 23 so as to be movable in the X-axis direction.

The sheave guide 23 is a box-like structure accommodating the fixed sheaves 24 and is disposed so as to be movable in the X-axis direction relative to the sheave frame 22. This embodiment will be described as applied to a structure in which the fixed sheaves 24 are accommodated in the sheave guide 23 in such an orientation that their rotation axis is substantially parallel to the X-axis direction.

It is to be noted that the position of the fixed sheaves 24 is not limited to the above-mentioned orientation, but may be such an orientation that their rotation axis is substantially parallel to the Y-axis direction; it is not specifically limited.

In addition, this embodiment will be described as applied to a structure in which the sheave guide 23 accommodates the three fixed sheaves 24. However, the number of fixed sheaves 24 may be less than three or more than three; it is not specifically limited.

The sheave portion 14 is not specifically limited. If the capacity of the winch 12 is low, a movable sheave may be provided at the hoisting jig 15; it is not specifically limited.

Figure 7:
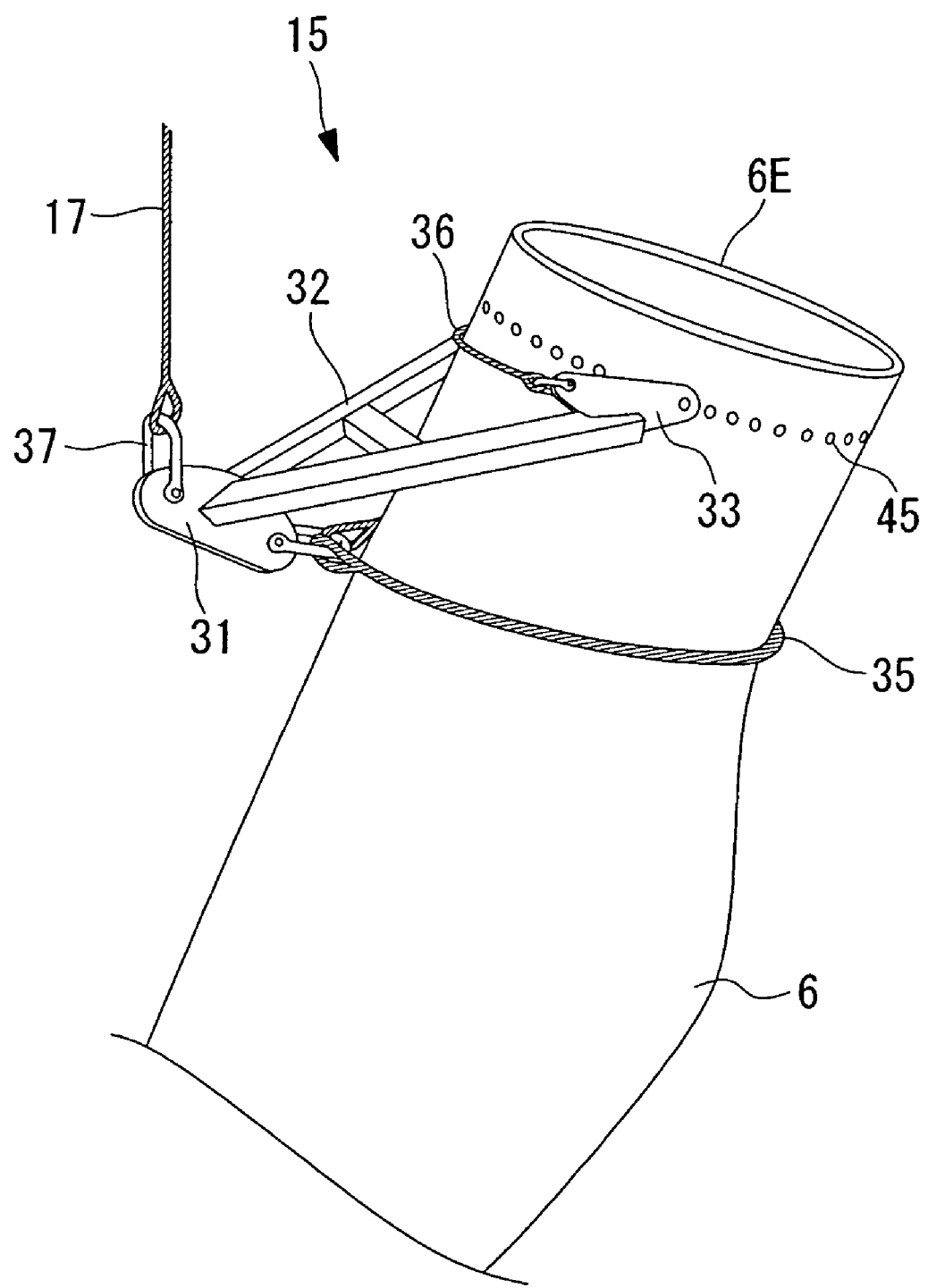
FIG. 7 is a perspective view showing the structure of the hoisting jig shown in FIG. 4.

FIG. 7 is a perspective view showing the structure of the hoisting jig shown in FIG. 4.

As shown in FIG. 7, the hoisting jig 15 holds the outer peripheral surface near an attaching end 6E of the wind-turbine rotor blade 6.

The hoisting jig 15 includes a connecting plate (connecting portion) 31, a jig main body (inclined portion) 32, fixing plates 33, fixing blocks 34, a retaining sling 35, and an auxiliary sling 36.

The connecting plate 31 is a plate-like member to both ends of which the hoisting wire 17 and the retaining sling 35 are attached through shackles 37. The jig main body 32 extending toward the attaching end 6E is fixed to substantially the center of the connecting plate 31.

The connecting portions of the connecting plate 31 and the shackles 37 may be directly connected, as shown in FIG. 7, or may be connected in combination with movable sheaves; they are not specifically limited. The hoisting point may be either one, as shown in FIG. 7, or two; it is not specifically limited.

The jig main body 32 consists of a pair of rod-like members extending from the connecting plate 31 in directions diverging from each other toward the attaching end 6E. The pair of fixing plates 33 are provided at the tips of the jig main body 32 so as to be in contact with the outer peripheral surface of the wind-turbine rotor blade 6.

Figure 8:
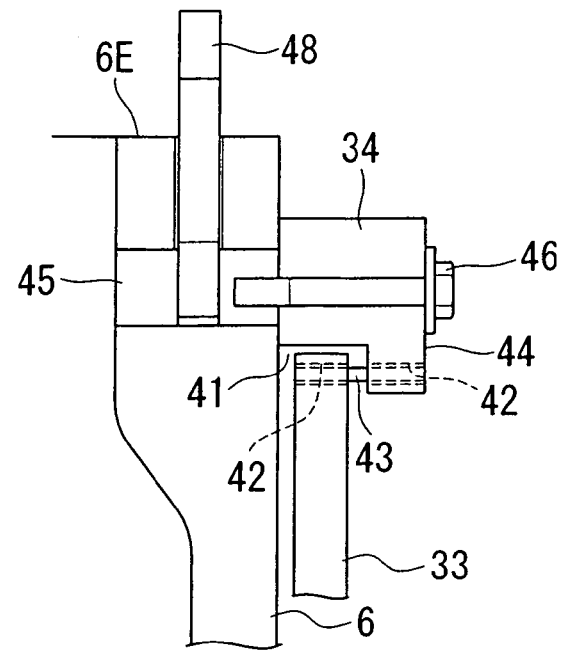
FIG. 8 is a schematic diagram showing the structures of a fixing plate shown in FIG. 7 and a fixing block.

FIG. 8 is a schematic diagram showing the structures of the fixing plate shown in FIG. 7 and the fixing block.

The fixing plates 33 are plate-like members, and, together with the fixing blocks 34 and the retaining sling 35, serve to attach the hoisting jig 15 to the wind-turbine rotor blade 6.

As shown in FIG. 8, the fixing plate 33 is fitted to a recess 41 provided between the fixing block 34 and the wind-turbine rotor blade 6. A through-hole 42, through which a fixing pin 43 is to be inserted, is formed through the fixing plate 33 and the fixing block 34. By inserting the fixing pin 43 through the through-hole 42, the fixing plate 33 is fixed between the fixing block 34 and the wind-turbine rotor blade 6. Thus, the fixing block 34 supports the force exerted in the direction along the longitudinal axis of the wind-turbine rotor blade 6 (refer to F1 shown in FIGS. 10 and 11).

The fixing plate 33 may be either fixed between the wind-turbine rotor blade 6 and the fixing block 34 with the fixing pin 43 and the through-hole 42, as described above, or disposed in an engaged manner between the wind-turbine rotor blade 6 and the fixing block 34 without the fixing pin 43 or the through-hole 42. It is not specifically limited.

The fixing blocks 34 are fixed to T nuts 45, which are arranged at equal intervals near the attaching end 6E of the wind-turbine rotor blade 6, as shown in FIG. 7, with bolts 46. As shown in FIG. 8, the fixing block 34 is provided with a projection 44 that, together with the wind-turbine rotor blade 6, defines the recess 41 in which the fixing plate 33 is disposed. The projection 44 is provided with the through-hole 42 through which the fixing pin 43 is to be inserted.

The fixing blocks 34 may be either attached to the wind-turbine rotor blade 6 only during attachment and removal of the wind-turbine rotor blade 6 or permanently attached to the outer peripheral surface of the wind-turbine rotor blade 6. It is not specifically limited.

Figure 9:
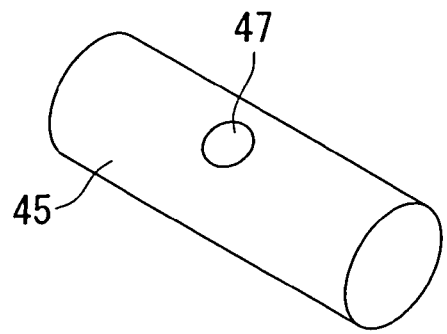
FIG. 9 is a schematic diagram showing the structure of a T nut shown in FIG. 8.

FIG. 9 is a schematic diagram showing the structure of the T nuts shown in FIG. 8.

As shown in FIG. 9, each T nut 45 is a member formed in a substantially columnar shape and is provided with a screw hole 47 in substantially the center thereof, into which a T bolt 48 is to be screwed. As shown in FIGS. 7 and 8, the T nuts 45 are embedded in the wall, which is made of fiber-reinforced plastic (FRP), of the wind-turbine rotor blade 6, at equal intervals in the circumferential direction.

The T bolts 48 attached to the T nuts 45 are bolts for fixing the wind-turbine rotor blade 6 to the rotor head 4. The T bolts 48 are bolts extending along the axis of the wind-turbine rotor blade 6 and are arranged so as to project from the attaching end 6E of the wind-turbine rotor blade 6.

As shown in FIG. 7, the retaining sling 35 is a sling attached to the connecting plate 31 via the shackle 37 and is wound around the outer peripheral surface of the wind-turbine rotor blade 6.

The auxiliary sling 36 is attached to the pair of fixing plates 33 and is wound around the outer peripheral surface of the wind-turbine rotor blade 6 opposite the connecting plate 31. Thus, the auxiliary sling 36 supports the force exerted in the radial direction of the wind-turbine rotor blade 6 (refer to F2 in FIGS. 10 and 11).

The fixing plates 33 may be fixed to the wind-turbine rotor blade 6 with the fixing blocks 34 and the auxiliary sling 36, as described above, or the fixing plates 33 may be fixed to the wind-turbine rotor blade 6 with only the fixing blocks 34; it is not specifically limited. In this case, the fixing blocks 34 are configured to support the forces denoted by F1 and F2 in FIGS. 10 and 11.

The auxiliary bracket 16, to which a hoisting auxiliary wire 18 is attached, is a bracket for retaining the tip of the wind-turbine rotor blade 6. The use of the auxiliary bracket 16 can prevent the wind-turbine rotor blade from being damaged when the wind-turbine rotor blade 6 is lifted.

As shown in FIGS. 2 and 4, once the hoisting apparatus 11 is attached, the wind-turbine rotor blade 6 is lifted (a lifting step S2).

The lifting is performed by simultaneously winding up the hoisting wire 17 attached to the hoisting jig 15 and the hoisting auxiliary wire 18 attached to the auxiliary bracket 16. More specifically, the hoisting wire 17 is wound up by the winch 12 disposed on the ground, through the sheave portion 14 and the pulleys 13. On the other hand, the hoisting auxiliary wire 18 is wound up by a heavy machine (not shown).

Thus, by simultaneously winding up the hoisting wire 17 and the hoisting auxiliary wire 18, the wind-turbine rotor blade 6 is lifted in the same orientation as it is on the ground, that is, an orientation in which the longitudinal axis of the wind-turbine rotor blade 6 is substantially horizontal.

When the wind-turbine rotor blade 6 is in a horizontal orientation, the hoisting jig 15 effectively retains the wind-turbine rotor blade 6 with only the retaining sling 35.

Figure 10:
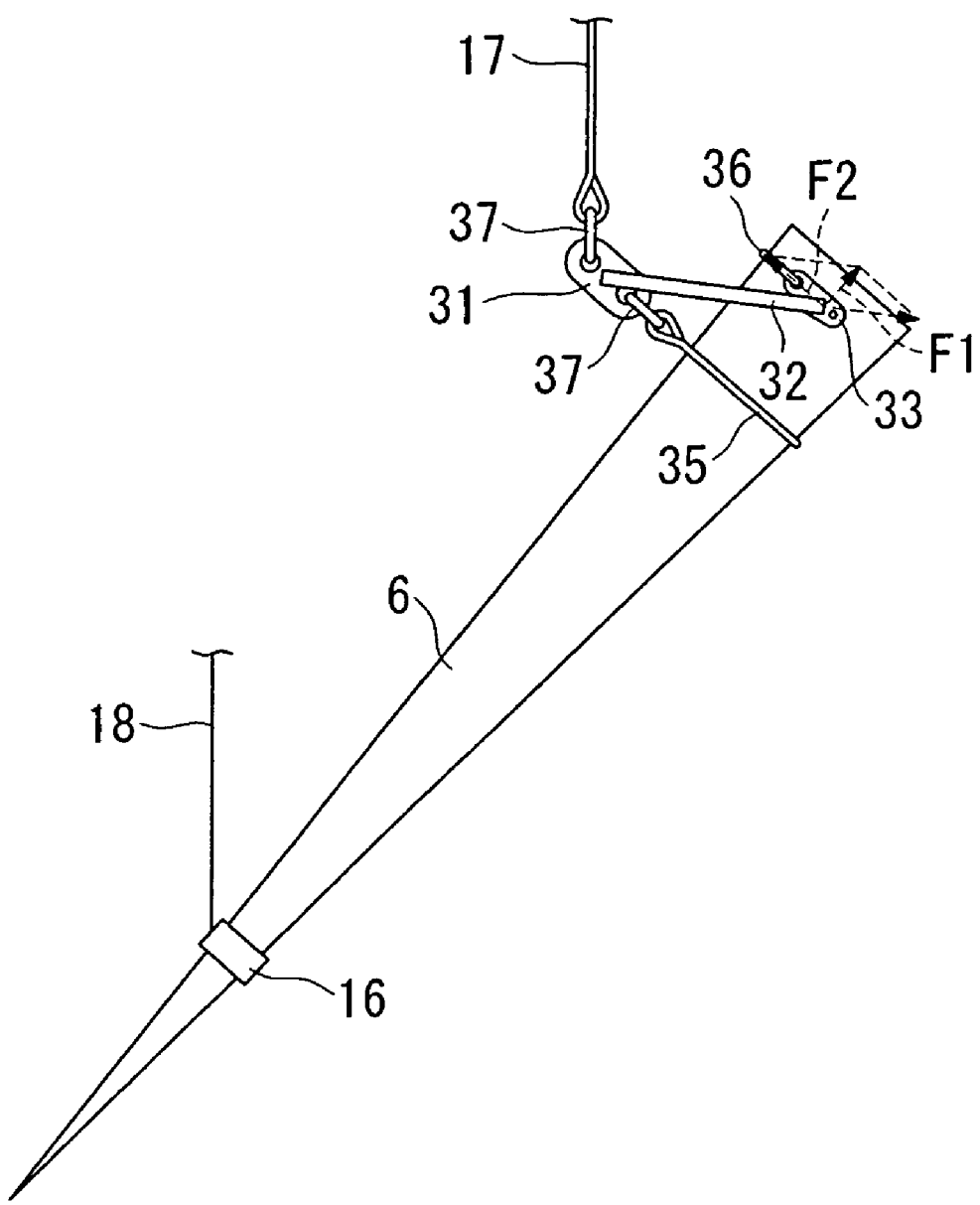
FIG. 10 is a schematic diagram showing rotation of the wind-turbine rotor blade during lifting thereof.
Figure 11:
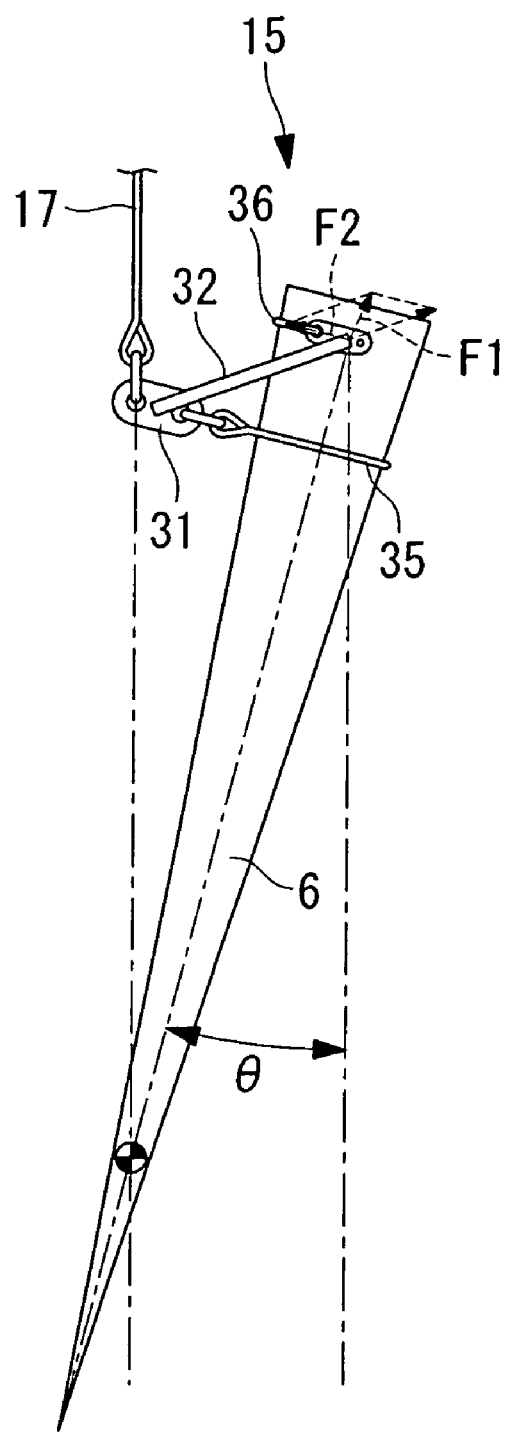
FIG. 11 is a schematic diagram showing rotation of the wind-turbine rotor blade during lifting thereof.

FIGS. 10 and 11 are schematic diagrams showing rotation of the wind-turbine rotor blade during lifting thereof.

When the wind-turbine rotor blade 6 is lifted upward, as shown in FIGS. 2, 10, and 11, the wind-turbine rotor blade is rotated (a rotating step S3).

More specifically, when the wind-turbine rotor blade 6 is lifted to a height where the tip thereof does not interfere with the ground, winding up of the hoisting auxiliary wire 18 is stopped, and only the hoisting wire 17 is wound up. As a result, as shown in FIG. 10, the attaching end 6E of the wind-turbine rotor blade 6 is lifted upward, and the orientation of the wind-turbine rotor blade 6 starts to rotate. The directions of the forces acting on the connecting plate 31 and the fixing plates 33 are indicated by the arrows in the drawing.

When the hoisting wire 17 is further wound up, the wind-turbine rotor blade 6 is hoisted only by the hoisting wire 17 and the hoisting jig 15, as shown in FIG. 11. As shown in FIG. 11, the auxiliary bracket 16 may be removed from the tip of the wind-turbine rotor blade 6 at this time, or, if the load acting on the hoisting auxiliary wire 18 is completely released, the auxiliary bracket 16 may be removed from the tip of the wind-turbine rotor blade 6 in a subsequent step. It is not specifically limited.

As shown in FIG. 11, the center of gravity of the wind-turbine rotor blade 6 is located on a line extending from the hoisting wire 17. Therefore, the wind-turbine rotor blade 6 stabilizes in an orientation in which the longitudinal axis thereof is inclined with respect to the vertical direction at an angle θ.

The angle θ is determined so as to be substantially equal to the sum of the tilt angle AT and the cone angle AC. More specifically, the lengths of the jig main body 32, retaining sling 35, and auxiliary sling 36 of the hoisting jig 15 are adjusted.

To simplify the explanation, the center of gravity of the wind-turbine rotor blade 6 is located near the tip in FIG. 11. However, in reality, the center of gravity is often located at a position shifted from the attaching end 6E toward the tip by a length equal to about one-third of the whole length of the wind-turbine rotor blade 6.

Figure 12:
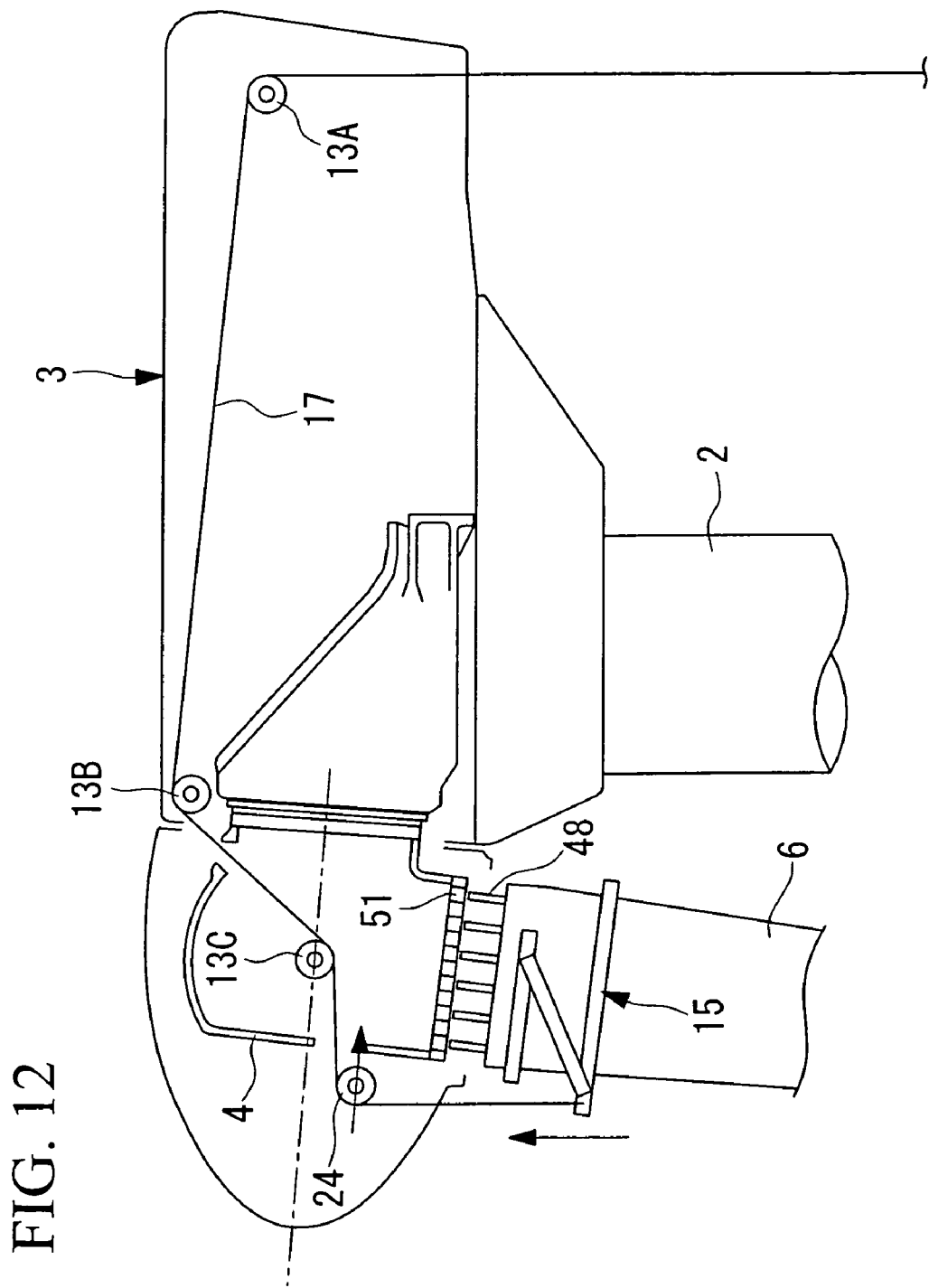
FIG. 12 is a schematic diagram showing attachment of the wind-turbine rotor blade to a rotor head.

FIG. 12 is a schematic diagram showing attachment of the wind-turbine rotor blade to the rotor head.

Thereafter, as shown in FIGS. 2 and 12, the wind-turbine rotor blade 6 is attached to the rotor head 4 (an attaching step S4).

First, the wind-turbine rotor blade 6 is lifted while the fixed sheaves 24 of the sheave portion 14 are arranged at a position away from the rotor head 4. This allows the tips of the T bolts 48 to be inserted into openings of attachment holes 51 provided in the rotor head 4, to which the T bolts 48 are to be inserted.

The T bolts 48 and the attachment holes 51 both extend in a direction inclined from the vertical direction by an angle equal to the sum of the cone angle AC and the tilt angle AT. Therefore, after the tips of the T bolts 48 are inserted into the openings of the attachment holes 51, the wind-turbine rotor blade 6 is lifted and the fixed sheaves 24 are brought toward the rotor head 4 to insert the T bolts 48 into the attachment holes 51.

When the attaching end 6E of the wind-turbine rotor blade 6 comes into contact with the rotor head 4, the wind-turbine rotor blade 6 is fixed to the rotor head 4 with the T bolts 48. Then, the hoisting jig 15 is removed from the wind-turbine rotor blade 6, and the sheave portion 14 is removed from the rotor head 4.

Then, in order to attach the next wind-turbine rotor blade 6 to the rotor head 4, the rotor head 4 is rotated about the rotation axis RL by about 120°, and the above-described process of attaching the wind-turbine rotor blade is performed again.

The sheave portion 14 may be rotated about the rotation axis RL by about 120° by attaching it and removing it from the rotor head 4 as described above, or, if the sheave portion 14 has a rotation function, the sheave portion 14 may be rotated about the rotation axis RL by about 120° without being removed from the rotor head 4. It is not specifically limited.

When all the wind-turbine rotor blades 6 are attached to the rotor head 4, the sheave portion 14 and the pulleys 13 are removed. Then, the process proceeds to the subsequent step of constructing the wind power generator 1.

Because the subsequent step of constructing the wind power generator 1 is a known step, an explanation thereof will be omitted.

When the wind-turbine rotor blades 6 are to be removed from the rotor head 4, the above-described steps are performed in the reverse order.

Figure 13:
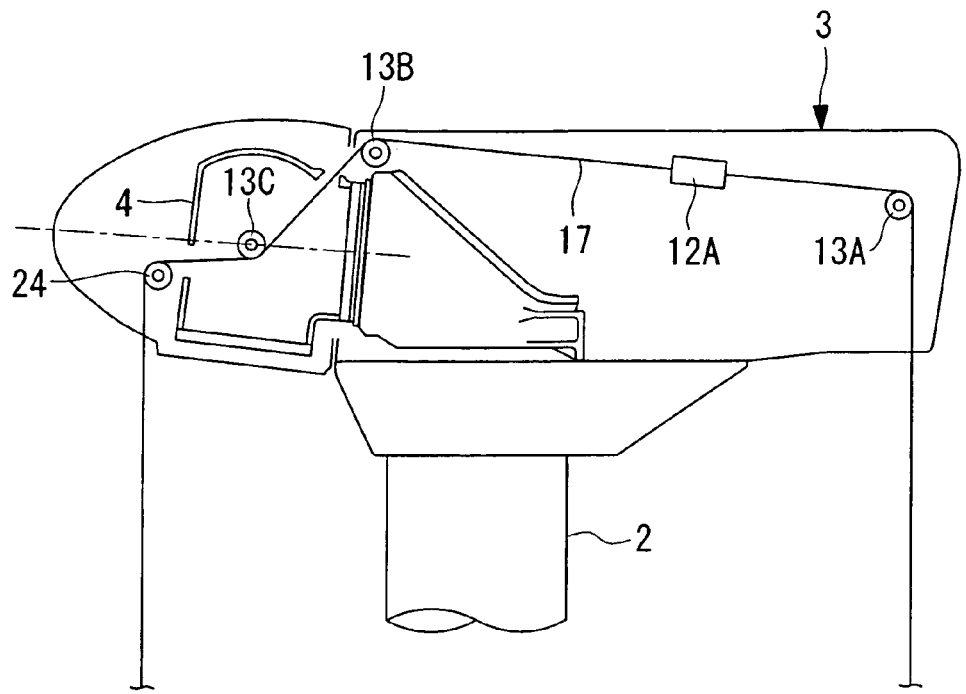
FIG. 13 is a schematic diagram showing the arrangement of the winch according to another example.

FIG. 13 is a schematic diagram showing the arrangement of the winch according to another example.

The winch 12 may be disposed on the ground, as in the above-described embodiment, or, a reciprocating winch 12A may be disposed in the nacelle 3, between the rear pulley 13A and the front pulley 13B, as shown in FIG. 13. In this case, the reciprocating winch 12A is fixed to a structure or the like in the nacelle 3 and draws the hoisting wire 17. On the other hand, a drum (not shown) for winding up the hoisting wire 17 is disposed on the ground. The load created by hoisting the wind-turbine rotor blade 6 does not act on the drum.

Figure 14:
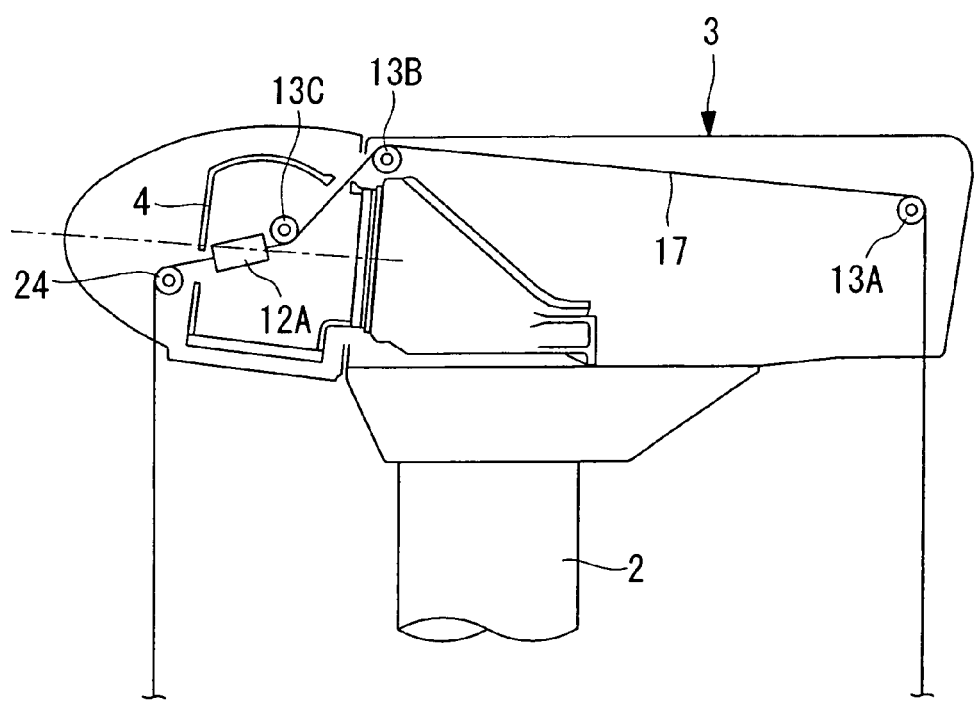
FIG. 14 is a schematic diagram showing the arrangement of the winch according to another example.

FIG. 14 is a schematic diagram showing the arrangement of the winch according to another example.

As shown in FIG. 14, the reciprocating winch 12A is disposed between the in-head pulley 13C and the sheave portion 14. In this case too, similarly to the case of FIG. 13, a drum (not shown) for winding up the hoisting wire 17 is disposed on the ground.

Figure 15:
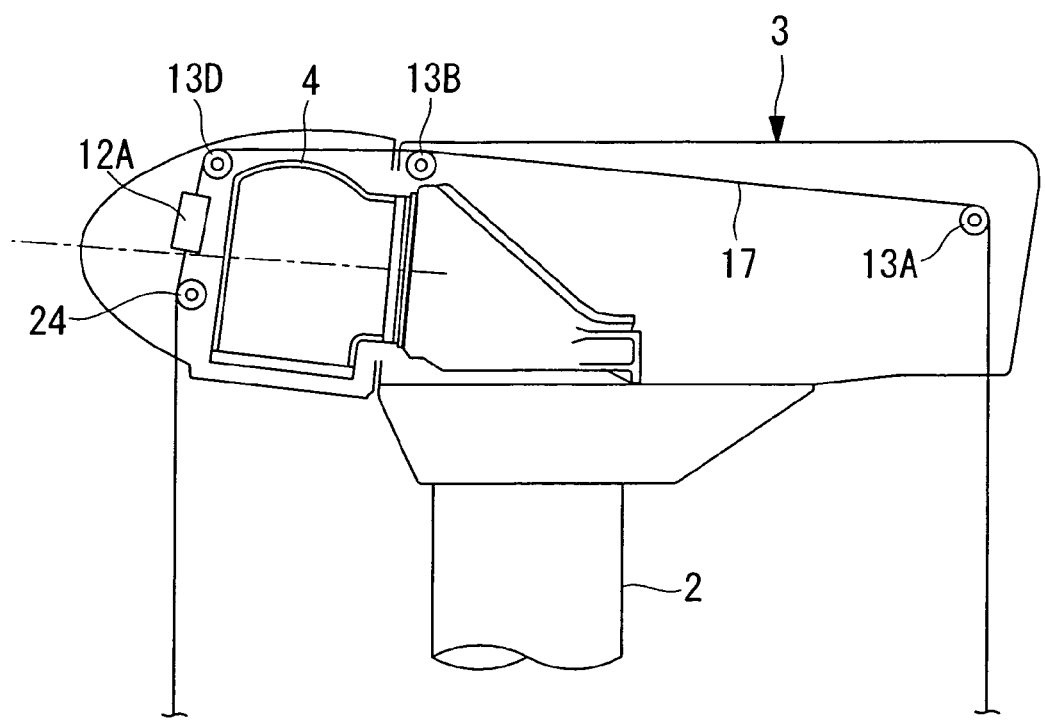
FIG. 15 is a schematic diagram showing the arrangement of the winch according to another example.

FIG. 15 is a schematic diagram showing the arrangement of the winch according to another example.

As shown in FIG. 15, the in-head pulley 13C may be disposed in front of the rotor head 4 to make an out-of-head pulley 13D, and the reciprocating winch 12A may be disposed between the out-of-head pulley 13D and the sheave portion 14. It is not specifically limited.

Figure 16:
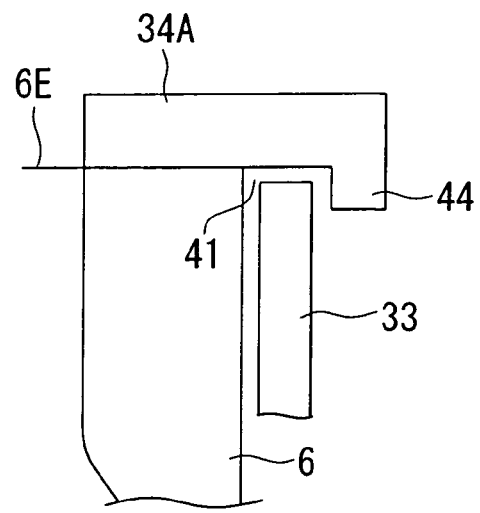
FIG. 16 is a schematic diagram showing the fixing block shown in FIG. 8, according to another example.

FIG. 16 is a schematic diagram showing the fixing block shown in FIG. 8, according to another example.

In the above-described embodiment, as shown in FIG. 8, the fixing blocks 34 are described as applied to the embodiment in which they are fixed to the T nuts 45. However, as shown in FIG. 16, a ring-plate-shaped fixing block 34A to be attached to the attaching end 6E may be used. It is not specifically limited.

Figure 17:
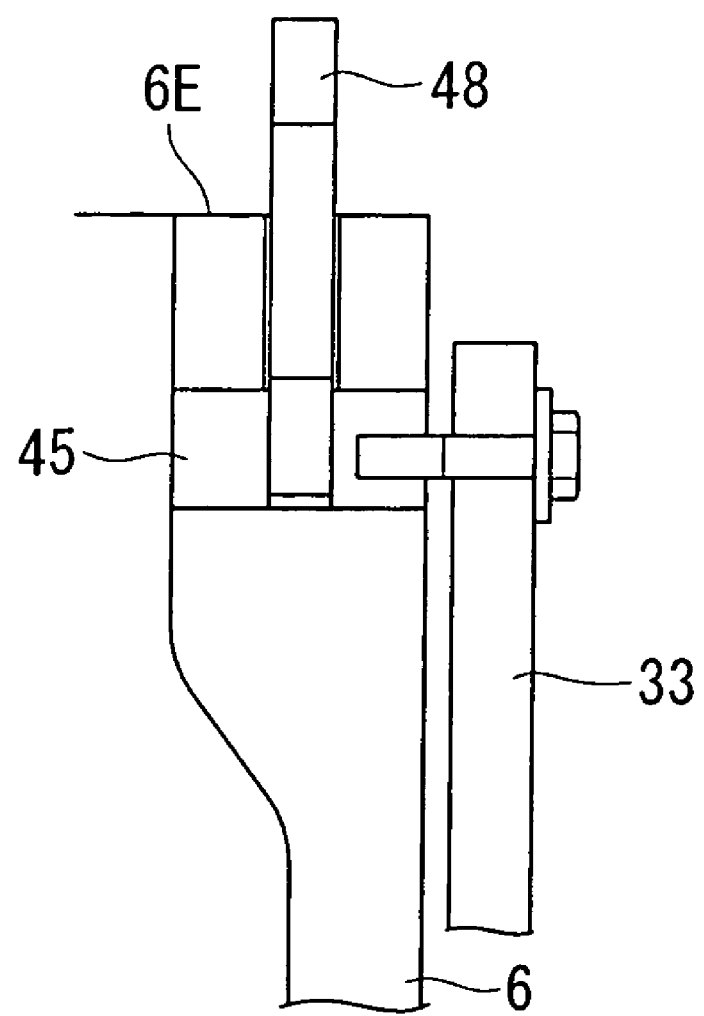
FIG. 17 is a schematic diagram showing another method for fixing the fixing plate shown in FIG. 8.

FIG. 17 is a schematic diagram showing another method for fixing the fixing plate shown in FIG. 8.

In the above-described embodiment, the fixing plates 33 are described as applied to the embodiment in which they are disposed between the wind-turbine rotor blade 6 and the fixing blocks 34, as shown in FIG. 8. However, as shown in FIG. 17, the fixing plates 33 may be directly fixed to the T nuts 45. It is not specifically limited.

In the above-described structure, the wind-turbine rotor blade 6 is hoisted by the hoisting wire 17 via the hoisting jig 15. At this time, the wind-turbine rotor blade 6 is in an orientation in which a line connecting the center of gravity of the wind-turbine rotor blade 6 and the connecting plate 31 extends in the vertical direction. In other words, the wind-turbine rotor blade 6 is hoisted in an orientation in which the longitudinal axis thereof crosses the vertical direction.

More specifically, when the angle, θ, formed between the vertical direction and the above-mentioned longitudinal axis direction is substantially equal to the sum of the tilt angle AT of the rotor head 4 and the cone angle AC of the wind-turbine rotor blade 6, the wind-turbine rotor blade 6 can be attached to or removed from the rotor head 4 without adjusting the orientation of the hoisted wind-turbine rotor blade 6. Thus, there is no need to use a heavy machine or the like for adjusting the orientation of the wind-turbine rotor blade 6.

Accordingly, this enables attachment and removal of the rotor head 4 without using a plurality of heavy machines, and also enables attachment and removal of the rotor head 4 at a site having a complex land shape with little flat land.

By moving the fixed sheaves 24 in a direction along the rotation axis RL of the rotor head 4, the wind-turbine rotor blade 6 can be moved relative to the rotor head 4 in the above-mentioned direction. Thus, by moving the fixed sheaves 24 in accordance with winding up or letting out of the hoisting wire 17, the wind-turbine rotor blade 6 can be moved toward or away from the rotor head 4 along the above-mentioned longitudinal axis direction.

More specifically, when the rotor head 4 and the wind-turbine rotor blade 6 are fixed with the T bolts 48 or the like that extend in the above-mentioned longitudinal axis direction, the wind-turbine rotor blade 6 can be moved toward or away from the rotor head 4 while preventing the T bolts 48 from interfering with the attachment holes 51, into which the T bolts 48 are to be inserted. Thus, there is no need to use a heavy machine or the like to prevent the T bolts 48 from interfering with the attachment holes 51.

Because winding up or letting out of the hoisting jig 15 and the wind-turbine rotor blade 6 held by the hoisting jig 15 is performed by the winch 12 disposed on the ground or by the reciprocating winch 12A disposed in the rotor head 4, the nacelle 3, or the like, the number of heavy machines to be used can be reduced compared to conventional hoisting of the wind-turbine rotor blade.

The connecting plate 31, to which the hoisting wire 17 is connected, is stably disposed radially outside of the wind-turbine rotor blade 6 by the jig main body 32 and the retaining sling 35. Therefore, even when a line connecting the center of gravity of the wind-turbine rotor blade 6 and the connecting plate 31 projects radially outward from the attaching end 6E, the wind-turbine rotor blade 6 can be stably hoisted.

The auxiliary sling 36 extending from the ends of the jig main body 32 is wound around the outer peripheral surface of the wind-turbine rotor blade 6 opposite the connecting plate 31 and presses the outer peripheral surface. Thus, the auxiliary sling 36 can prevent the wind-turbine rotor blade 6 from rotating about the center of gravity to stabilize the orientation of the wind-turbine rotor blade 6.

Because the wind-turbine rotor blade 6 is lifted from the ground by the hoisting apparatus 11 and the auxiliary bracket 16 according to this embodiment while maintaining the orientation and is then hoisted by the hoisting jig 15, the tip of the wind-turbine rotor blade 6 is prevented from interfering with the ground. Thus, the wind-turbine rotor blade 6 can be prevented from being damaged.

Second Embodiment

Referring to FIGS. 18 to 26, a hoisting apparatus according to a second embodiment of the present invention will be described.

The hoisting apparatus according to this embodiment is the same as that according to the first embodiment in the basic structure, but differs from that according to the first embodiment in the structure of the hoisting jig. Accordingly, in this embodiment, the structure of the hoisting jig will be described with reference to FIGS. 18 to 26, and explanations of the structure of the wind power generator and the like will be omitted.

Figure 18:
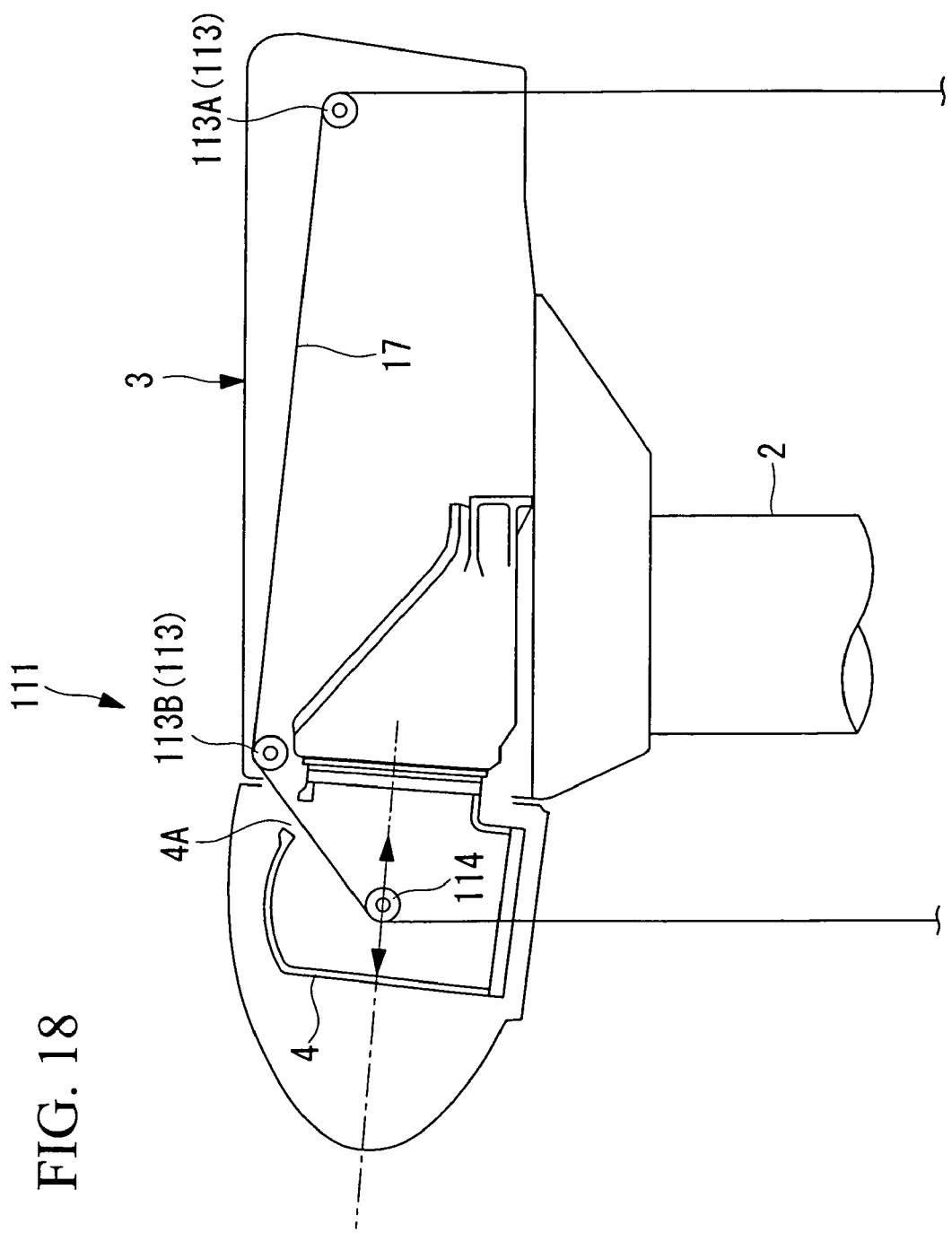
FIG. 18 is a schematic diagram showing the arrangement of pulleys and a sheave in a hoisting apparatus according to a second embodiment of the present invention.
Figure 19:
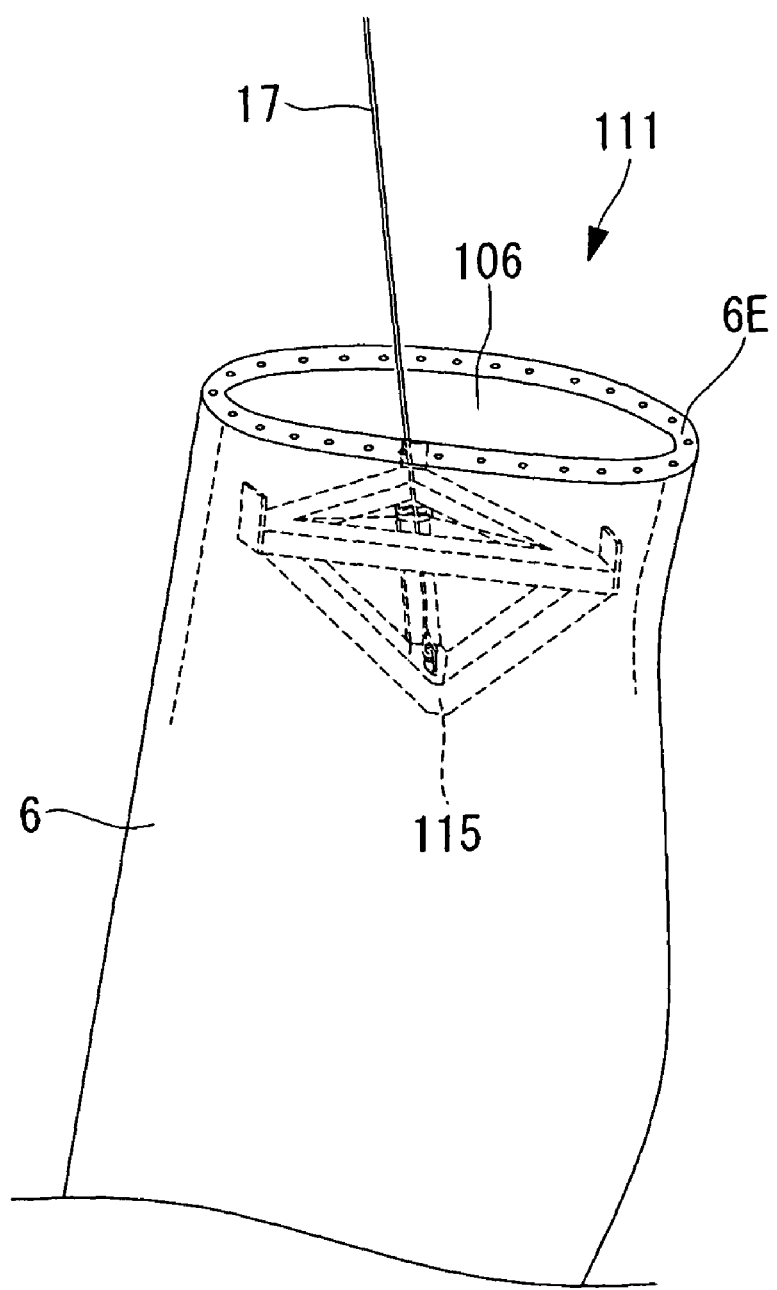
FIG. 19 is a schematic diagram showing the hoisting jig in the hoisting apparatus according to the second embodiment of the present invention in an attached state.

FIG. 18 is a schematic diagram showing the arrangement of pulleys and a sheave in the hoisting apparatus according to this embodiment, and FIG. 19 is a schematic diagram showing the hoisting jig in the hoisting apparatus according to this embodiment in an attached state.

Like reference numerals designate the same components as those of the first embodiment, and explanations thereof will be omitted.

As shown in FIGS. 18 and 19, a hoisting apparatus 111 according to this embodiment includes the winch 12, pulleys 113, a sheave portion (sheave) 114, and a hoisting jig (retaining portion) 115 (refer to FIG. 2).

As shown in FIG. 18, the pulleys 113 guide the hoisting wire 17 extending from the winch 12 to the sheave portion 114.

The hoisting wire 17 extending from the winch 12 is wound around a rear pulley 113A disposed at the rear of the nacelle 3 and is guided to a front pulley 113B disposed at the front of the nacelle 3. The hoisting wire 17 wound around the front pulley 113B is guided to the sheave portion 114 disposed in the rotor head 4.

The sheave portion 114 is disposed in the rotor head 4 and guides the hoisting wire 17 guided by the front pulley 113B to the hoisting jig 115.

Because the specific structure of the sheave portion 114 is substantially the same as the structure of the sheave portion 14 according to the first embodiment, an explanation thereof will be omitted.

Figure 20:
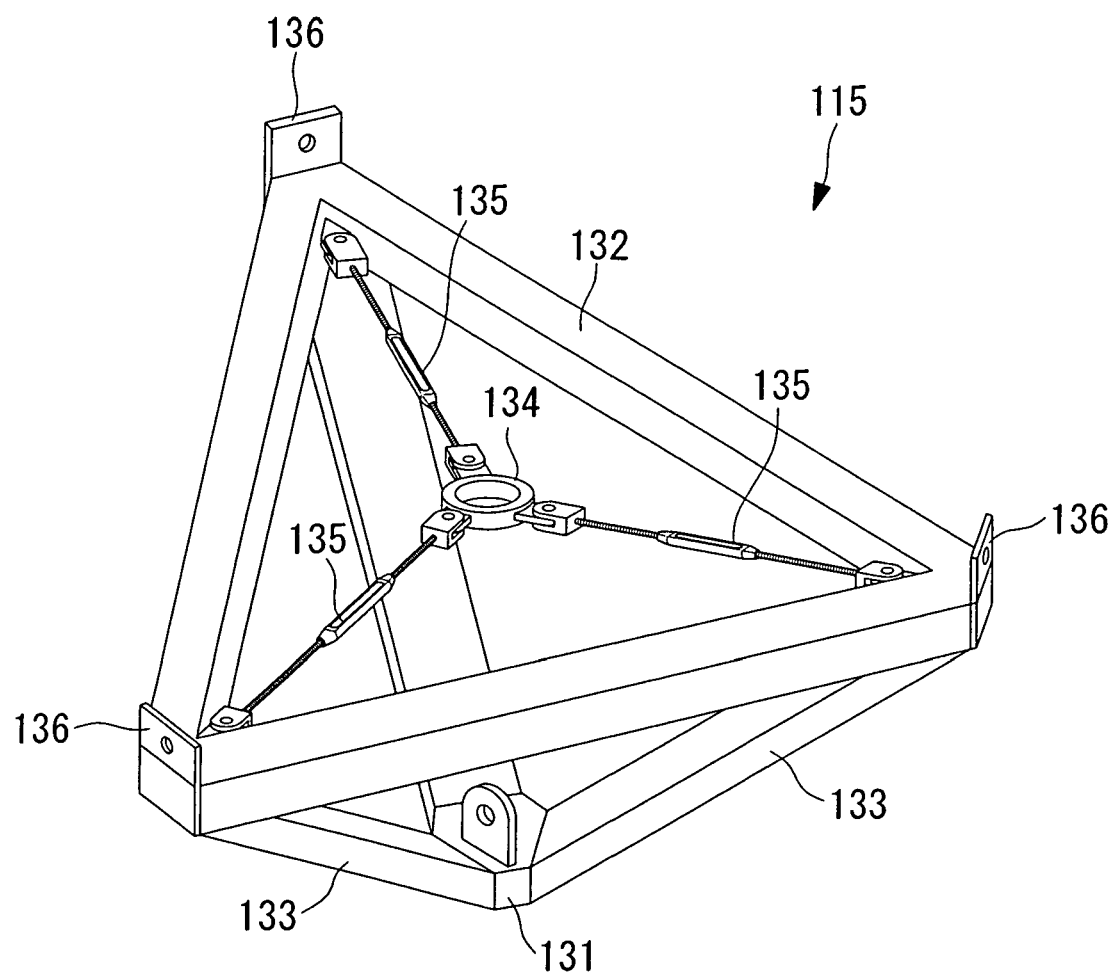
FIG. 20 is a schematic diagram showing the structure of the attaching jig shown in FIG. 19.

FIG. 20 is a schematic diagram showing the structure of the attaching jig shown in FIG. 19.

As shown in FIG. 19, the hoisting jig 115 is attached to the inside of an opening 106 formed at the attaching end 6E of the wind-turbine rotor blade 6.

As shown in FIG. 20, the hoisting jig 115 includes a connecting plate (connecting portion) 131 to which the hoisting wire 17 is to be attached, an upper frame (frame) 132 to be attached to the inner circumference surface of the opening 106, lower frames 133 connecting the upper frame 132 and the connecting plate 131, a center ring (insertion portion) 134 for maintaining the orientation of the hoisting wire 17 extending from the connecting plate 131, and supporting portions 135.

The center ring 134 and the supporting portions 135 are configured to be attachable to and removable from the upper frame 132.

The upper frame 132 is formed by connecting rod-like members in a triangle shape. Eye plates 136, which are used when attached to the wind-turbine rotor blade 6, are provided outside the vertices of the triangle. The supporting portions 135, which support the center ring 134, are provided inside the vertices. Furthermore, the lower frames 133 extending toward the connecting plate 131 are provided at the vertices of the upper frame 132.

Figure 21:
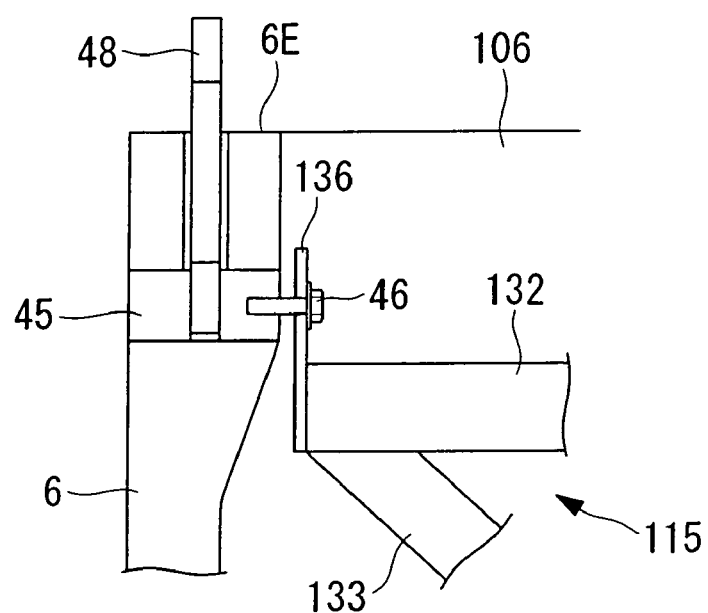
FIG. 21 is a schematic diagram showing the structure of a connecting portion of the wind-turbine rotor blade and the hoisting jig shown in FIG. 19.

FIG. 21 is a schematic diagram showing the structure of a connecting portion of the wind-turbine rotor blade and the hoisting jig shown in FIG. 19.

As shown in FIG. 21, the eye plate 136 of the upper frame 132 is fixed to the T nut 45 provided in the wind-turbine rotor blade 6 with the bolt 46 from the inner circumference side.

Figure 22:
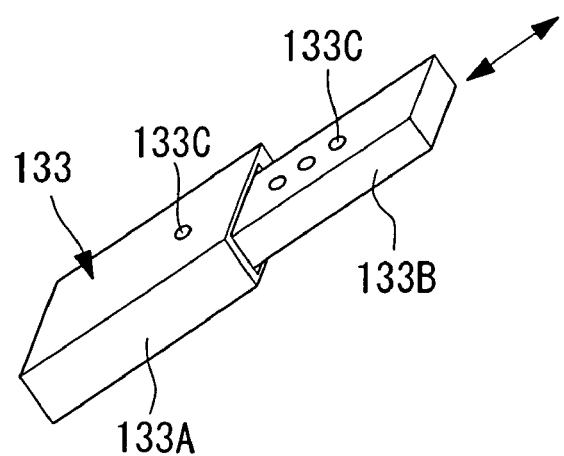
FIG. 22 is a schematic diagram showing the structure of a lower frame shown in FIG. 20.

FIG. 22 is a schematic diagram showing the structure of the lower frame shown in FIG. 20.

The lower frames 133 are rod-like members disposed between the connecting plate 131 and the upper frame 132, and are adjustable in length.

As shown in FIG. 22, each lower frame 133 consists of a tubular outer member 133A and an inner member 133B disposed therein, which are coaxial, and a lock pin (not shown) inserted in through-holes 133C provided in the outer member 133A and the inner member 133B. In addition, hinges or the like are disposed at the connecting portions of the lower frames 133 and the upper frame 132 and of the lower frames 133 and the connecting plate 131 and are configured such that the relative angles of the lower frames 133 to the upper frame 132 and of the lower frames 133 to the connecting plate 131 can be changed.

By sliding the outer member 133A and the inner member 133B relative to each other, the length of the lower frame 133 is adjusted, and by inserting the lock pin into the through-holes 133C, the length of the lower frame 133 is fixed to a predetermined value.

Thus, by adjusting the length of each lower frame 133, the position of the connecting plate 131 relative to the upper frame 132 is adjusted.

The lower frame 133 may be configured such that the length thereof is adjusted by sliding the outer member 133A and the inner member 133B, by using a screw or by using a piston; it is not specifically limited.

The lower frames 133 may be either configured to be adjustable in length as described above or formed of rod-like members with a predetermined fixed length; it is not specifically limited.

As shown in FIG. 20, the supporting portions 135 support the center ring 134. In this embodiment, the supporting portions 135 will be described as applied to turnbuckles. When applied to turnbuckles, the supporting portions 135 support tensile load.

The supporting portions 135 are not limited to those applied to turnbuckles, but may be those having another length-adjusting function; it is not specifically limited. Furthermore, the supporting portions 135 may support not only tensile load but also compressive load.

The center ring 134 is a circular member, through which the hoisting wire 17 is allowed to pass. The supporting portions 135 are attached to the outer circumference of the center ring 134.

The relative positions of the center ring 134 and the upper frame 132 are performed by adjusting the lengths of the supporting portions 135.

Figure 23:
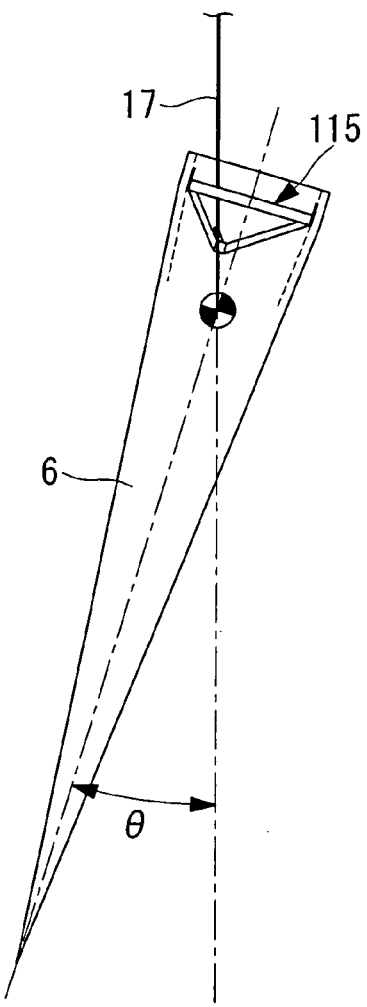
FIG. 23 is a schematic diagram showing the wind-turbine rotor blade hoisted by the hoisting jig shown in FIG. 20.
Figure 24:
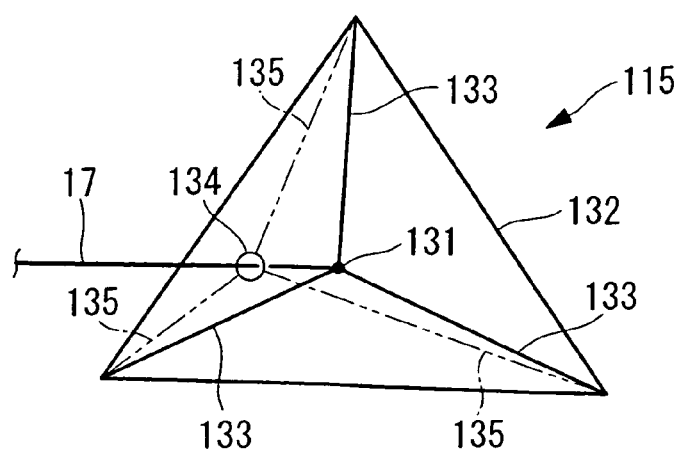
FIG. 24 is a top view showing the structure of the hoisting jig in the state in FIG. 23.

FIG. 23 is a schematic diagram showing a state in which the wind-turbine rotor blade is hoisted by the hoisting jig shown in FIG. 20. FIG. 24 is a top view showing the structure of the hoisting jig in the state in FIG. 23.

As described above, FIG. 23 shows a state in which the wind-turbine rotor blade 6 is hoisted by the hoisting jig 115, in which the positions of the connecting plate 131 and the center ring 134 relative to the upper frame 132 are adjusted. At this time, similarly to the first embodiment, the wind-turbine rotor blade 6 is in an orientation in which the angle, θ, formed between the vertical direction and the longitudinal axis direction of the wind-turbine rotor blade 6 is substantially equal to the sum of the tilt angle AT and the cone angle AC.

As shown in FIG. 24, when the hoisting jig 115 is viewed from above, the connecting plate and the center ring 134 are arranged in such a positional relationship that they guide the hoisting wire 17 at a predetermined angle with respect to the vertical direction.

Because the method for attaching and removing the wind-turbine rotor blades 6 using the hoisting apparatus 111 having the above-described structure is the same as that according to the first embodiment, an explanation thereof will be omitted.

Figure 25:
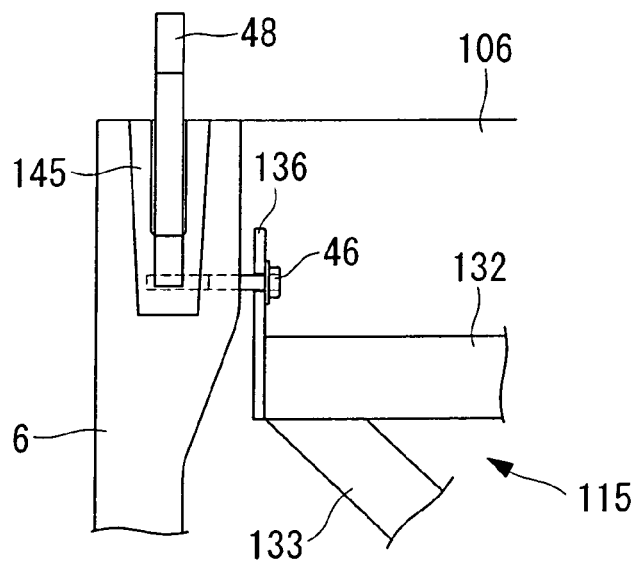
FIG. 25 is a schematic diagram showing another structure of the connecting portion of the wind-turbine rotor blade and hoisting jig in FIG. 21.

FIG. 25 is a schematic diagram showing another structure of the connecting portion of the wind-turbine rotor blade and hoisting jig shown in FIG. 21.

The eye plates 136 may be fixed to the T nuts 45, as in the above-described embodiment, or, the eye plates 136 may be fixed to cylindrical ring flanges 145 embedded in the wind-turbine rotor blade 6 with the bolts 46. It is not specifically limited.

The ring flanges 145 are cylindrical members made of a metal, and may be either consist of separated segments or formed as a single part; it is not specifically limited.

Figure 26:
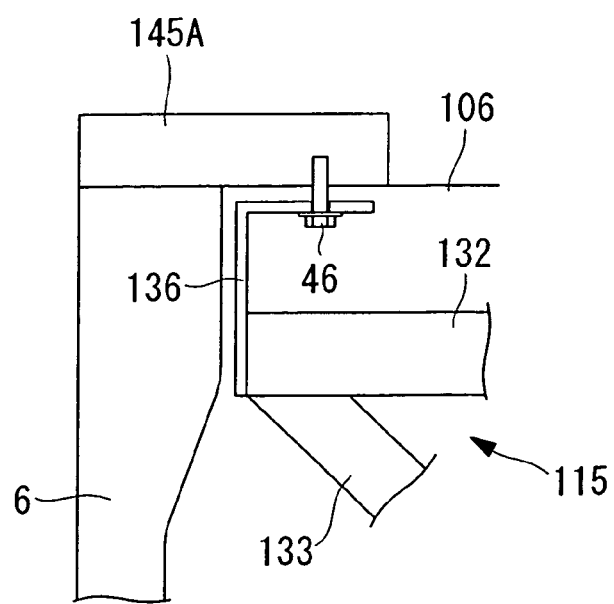
FIG. 26 is a schematic diagram showing another structure of the connecting portion of the wind-turbine rotor blade and hoisting jig in FIG. 21.

FIG. 26 is a schematic diagram showing another structure of the connecting portion of the wind-turbine rotor blade and hoisting jig shown in FIG. 21.

As shown in FIG. 26, the hoisting jig 115 may also be fixed to the inner surface of a ring-plate-shaped flange 145A, which is attached to the attaching end 6E of the wind-turbine rotor blade 6, with the bolts 46. In the case of this structure, the eye plates 136 are shaped such that their tips are bent along the surface of the flange 145A.

In the above-described structure, the upper frame 132 is attached to the opening 106 provided in the attaching end 6E to hoist the wind-turbine rotor blade 6 via the connecting plate 131 provided on the upper frame 132. Accordingly, even when a line connecting the center of gravity of the wind-turbine rotor blade 6 and the connecting plate 131 passes through the inside of the opening 106, the hoisting wire 17 and the wind-turbine rotor blade 6 can be prevented from interfering with each other. Thus, the wind-turbine rotor blade 6 can be stably hoisted.

By allowing the hoisting wire 17 to pass through the center ring 134, the relative positional relationship between the hoisting wire 17 and the hoisting jig 115 stabilizes. Accordingly, the orientation of the wind-turbine rotor blade 6 hoisted by the hoisting wire 17 via the hoisting jig 115 also stabilizes.

The invention claimed is:

1. A wind-turbine rotor-blade hoisting apparatus comprising:
   a sheave that guides a hoisting wire from a rotor head, to which a wind-turbine rotor blade is to be attached, toward the wind-turbine rotor blade and that is arranged so as to be movable in a direction along a rotation axis of the rotor head;
   a retaining portion that retains an attaching end of the wind-turbine rotor blade such that a line connecting the center of gravity of the wind-turbine rotor blade and a connecting portion, to which the hoisting wire is connected, crosses a longitudinal axis of the wind-turbine rotor blade; and
   a winch that is disposed in the rotor head, in a nacelle to which the rotor head is attached, or on the ground and that draws the hoisting wire to wind up or let out the retaining portion,
   wherein the retaining portion includes an inclined portion that is inclined toward the attaching end and extends from the connecting portion disposed radially outside of the wind-turbine rotor blade toward the wind-turbine rotor blade, and a retaining sling that extends from the connecting portion and is wound around the outer peripheral surface of the wind-turbine rotor blade,
   wherein the retaining portion supports the wind-turbine rotor blade at a fixed point between the inclined portion and the wind-turbine rotor blade, and at a contact point between the retaining sling and the wind-turbine rotor blade arranged with an interval in a longitudinal direction of the wind-turbine rotor blade.

2. The wind-turbine rotor-blade hoisting apparatus according to claim 1,
   wherein the inclined portion branches so as to sandwich the wind-turbine rotor blade, and
   wherein an auxiliary sling that extends from ends of the inclined portion and is wound around the outer peripheral surface of the wind-turbine rotor blade opposite the connecting portion is provided.

3. A method for attaching a wind-turbine rotor blade comprising:
   a preparation step in which the wind-turbine rotor-blade hoisting apparatus comprising:

a sheave that guides a hoisting wire from a rotor head, to which a wind-turbine rotor blade is to be attached, toward the wind-turbine rotor blade and that is arranged so as to be movable in a direction along a rotation axis of the rotor head;

a retaining portion that retains an attaching end of the wind-turbine rotor blade such that a line connecting the center of gravity of the wind-turbine rotor blade and a connecting portion, to which the hoisting wire is connected, crosses a longitudinal axis of the wind-turbine rotor blade; and a winch that is disposed in the rotor head, in a nacelle to which the rotor head is attached, or on the ground and that draws the hoisting wire to wind up or let out the retaining portion, wherein the retaining portion includes an inclined portion that is inclined toward the attaching end and extends from the connecting portion disposed radially outside of the wind-turbine rotor blade toward the wind-turbine rotor blade, and a retaining sling that extends from the connecting portion and is wound around the outer peripheral surface of the wind-turbine rotor blade, is attached to a wind-turbine rotor blade disposed on the ground and a rotor head disposed on a tower and in which a hoisting auxiliary bracket is attached to a tip of the wind-turbine rotor blade;

a lifting step in which the hoisting wire attached to the retaining portion and a hoisting auxiliary wire attached to the hoisting auxiliary bracket are pulled to lift the wind-turbine rotor blade in the same orientation as it is on the ground;

a rotating step in which the wind-turbine rotor blade is further pulled by the hoisting apparatus to rotate the orientation of the wind-turbine rotor blade; and an attaching step in which the wind-turbine rotor blade is attached to the rotor head, in the lifting step, the retaining portion supports the wind-turbine rotor blade at a fixed point between the inclined portion and the wind-turbine rotor blade, and at a contact point between the retaining sling and the wind-turbine rotor blade arranged with an interval in a longitudinal direction of the wind-turbine rotor blade.

4. The method for attaching a wind-turbine rotor blade according to claim 3, wherein, in the attaching step, the wind-turbine rotor blade is pulled and the position of the sheave attached to the rotor head is moved in the direction along the rotation axis of the rotor head.

5. A method for constructing a wind power generator using the method for attaching a wind-turbine rotor blade according to claim 3.

6. A wind-turbine rotor-blade hoisting apparatus comprising:

a sheave that guides a hoisting wire from a rotor head, to which a wind-turbine rotor blade is to be attached, toward the wind-turbine rotor blade and that is arranged so as to be movable in a direction along a rotation axis of the rotor head;

a retaining portion that retains an attaching end of the wind-turbine rotor blade such that a line connecting the center of gravity of the wind-turbine rotor blade and a connecting portion, to which the hoisting wire is connected, crosses a longitudinal axis of the wind-turbine rotor blade; and a winch that is disposed in the rotor head, in a nacelle to which the rotor head is attached, or on the ground and that draws the hoisting wire to wind up or let out the retaining portion, wherein the retaining portion includes a frame to be attached to the inside of an opening provided in the attaching end of the wind-turbine rotor blade, and wherein the frame includes the connecting portion.

7. The wind-turbine rotor-blade hoisting apparatus according to claim 6, wherein the frame includes an insertion portion through which the hoisting wire extending from the connecting portion toward the sheave, passes.

* * * * *